United States Patent [19]

Nakao et al.

[11] Patent Number: 4,678,182

[45] Date of Patent: Jul. 7, 1987

[54] BICYCLE ERGOMETER AND EDDY CURRENT BRAKE THEREFOR

[75] Inventors: Shinroku Nakao, Kanagawa; Masao Itoh, Tokyo; Akira Itoh, Tokyo; Hiroshi Takano, Tokyo, all of Japan

[73] Assignee: Combi Co., Ltd., Tokyo, Japan

[21] Appl. No.: 588,933

[22] Filed: Mar. 13, 1984

[30] Foreign Application Priority Data

Jul. 8, 1983 [JP] Japan ................................. 58-123172
Jul. 8, 1983 [JP] Japan ................................. 58-123173

[51] Int. Cl.$^4$ ............................................. A63B 69/16
[52] U.S. Cl. ..................................... 272/73; 272/129; 310/67 A; 310/93; 310/115
[58] Field of Search ................... 272/73, DIG. 6, 129; 310/74, 67, 115, 116, 105, 92, 93, 103; 75/123 L

[56] References Cited

U.S. PATENT DOCUMENTS

| | | | |
|---|---|---|---|
| 3,663,850 | 5/1972 | Phelon | 310/74 |
| 3,790,831 | 2/1974 | Morreale | 310/74 |
| 3,845,756 | 11/1974 | Olsson | 272/129 |
| 3,867,211 | 2/1975 | Easton | 75/123 L |
| 4,244,021 | 1/1981 | Chiles, III | 272/DIG. 6 |

OTHER PUBLICATIONS

S. G. George et al., "*Mechanics of Materials*", 1943, p. 57.

*Primary Examiner*—Leo P. Picard
*Attorney, Agent, or Firm*—Finnegan, Henderson, Farabow, Garrett and Dunner

[57] ABSTRACT

A bicycle ergometer includes an eddy current brake having a rotor assembly including an iron material having a carbon content of 0.12% or less and a silicon content of 0.35% or less, a stator provided in the rotor assembly, a plurality of exciting coils provided on the stator, and a power source for energizing the exciting coils. The ergometer includes an input panel for inputting physical attributes of the user, e.g., age and sex, a pulse sensor for measuring the heart rate of the user at rest and during exercise on the ergometer, an arithmetic control circuit for calculating a training program and heart rate range and for controlling the eddy current brake to present a load to the user which will maintain the user's heart rate in a predtermined range. The method of using the ergometer enables a user to select a physical strength program and a weight reduction program with the selected program reflecting the age, sex, and the present physical condition of the user.

3 Claims, 36 Drawing Figures

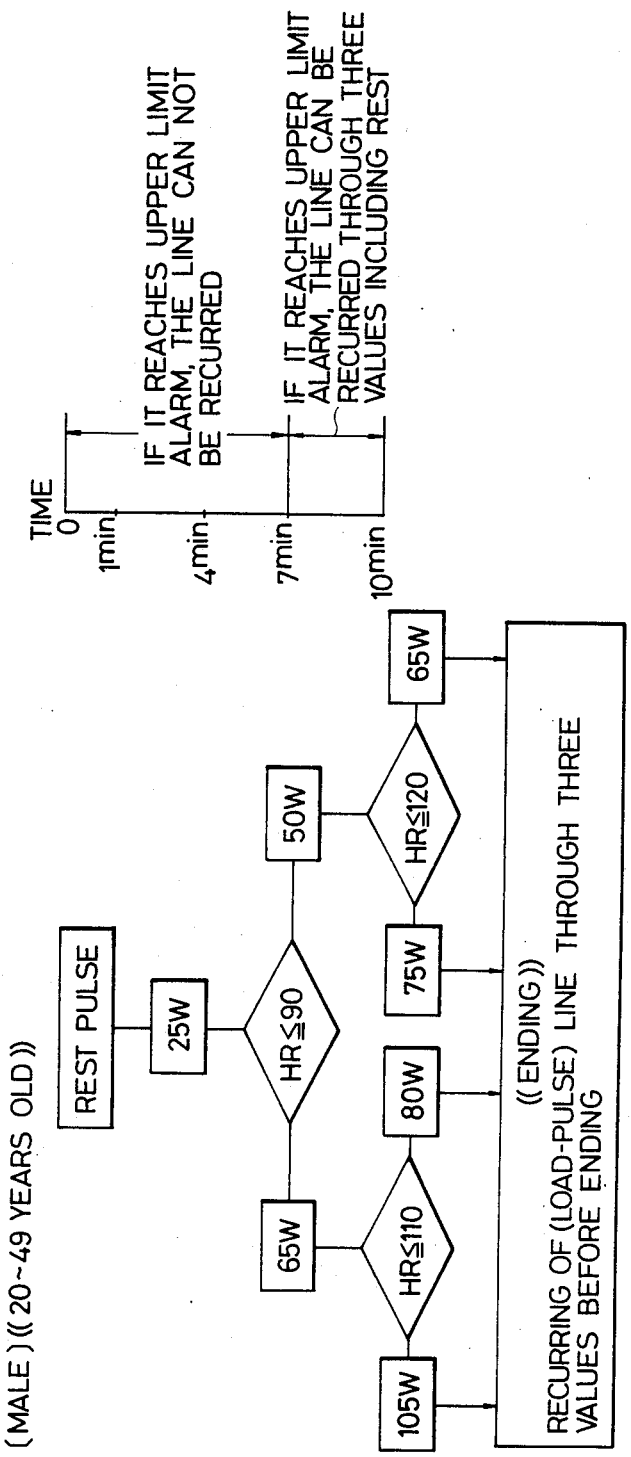

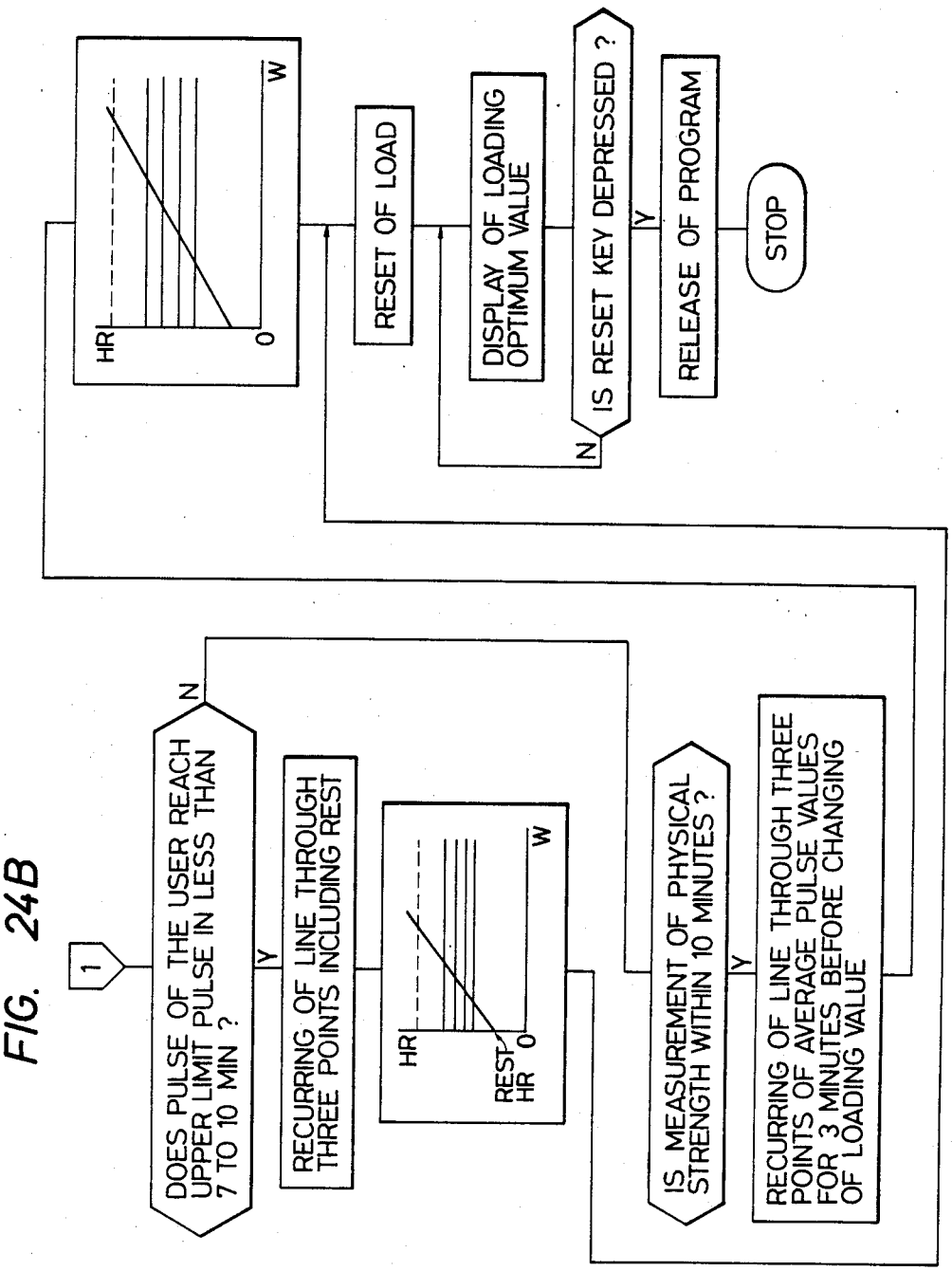

((MALE)) 20~34 YEARS OLD ((MALE)) 35~49 YEARS OLD ((MALE)) MORE THAN 50 YEARS OLD ((FEMALE)) 20~34 YEARS OLD ((FEMALE)) 35~49 YEARS OLD

GOING TO "1" OF FIG. 24B

BICYCLE ERGOMETER AND EDDY CURRENT BRAKE THEREFOR

FIELD OF THE INVENTION

This invention relates to bicycle ergometers, and more particularly to a training device using an ergometer, and to a method in which the bicycle ergometer is used to obtain an optimum load value and a steady number of pulses per minute for the continuous exercise of the user.

BACKGROUND OF THE INVENTION

An ergometer is commercially available which comprises a flywheel which is driven by the legs of the operator, and a belt for applying load to the flywheel by friction. The amount of the applied load is controlled by adjusting a weight which is provided at the end of the belt. The ergometer is advantageous in that, in the case when the flywheel is turned at a constant speed, the amount of load can be obtained directly from the value of the weight. It is disadvantageous, however, in that the measurement of the load takes a relatively long time, the size of the load is large, and adjustment of the load is intricate.

Recently, an ergometer with electrical loading means also became available in the market. One such ergometer comprises a flywheel made of gray cast iron, a rotation sensor for detecting the speed of rotation of the flywheel, and a torque detecting strain gauge. To obtain predetermined torque in the ergometer, the current supplied to the electromagnetic brake is controlled according to a relation between the output of the strain gauge and the speed of rotation of the flywheel.

In another example, the relation between the flywheel's speed and torque and the control current value are calculated by a computer or the like in advance and stored in a memory unit. According to the instruction code of a program, current to be applied to the braking coil is determined from the speed of rotation of the flywheel and a desired braking force to obtain a predetermined torque.

The torque detecting means of the former ergometer is mechanical, and an intricate adjustment must be carried out before the ergometer is operated or after it has been used for a long time. In the latter ergometer, complicated calculations must be performed, and it is necessary to provide another memory unit for storing the results of calculations as data. In these ergometers, the loading means is electrically controlled to obtain the predetermined torque.

Each of the electric ergometers has the further disadvantage in that, because the flywheel is made up of a stator and a rotor provided inside the stator, the stator must have exciting coils that are large in size. Accordingly, the loading device is also large in size, and the rotor inside the stator is maintained at a high temperature.

A variety of bicycle ergometers have been proposed as training units in which, according to an instruction from a microcomputer incorporated therein, physical attributes (age, weight, sex and the number of pulses per minute) of a person are inputted and processed to calculate an optimum load value and the number of pulses for control under the optimum load. The object is to control the exercise of the user continuously according to the data thus calculated.

In the above-described method for use of the ergometers, the optimum load value is calculated with the static elements (age, sex, weight, and rest number of pulses) of the physical conditions as data, and can be used as a reference when the user exercises continuously. However, in the determination of the optimum load value, no variation of the physical characteristics of the user which occur during continuous exercise are taken into consideration. Therefore, the optimum load value that is calculated cannot be used for all the users. That is, depending on the user, the number of pulses per minute reaches the athletic maximum number of pulses per minute before it reaches the steady number of pulses per minute which is provided under the optimum load.

In order to obtain the steady number of pulses per minute of a person under accurate optimum load, the following method should be employed. First, the load of a rotary exercising device driven by a user is increased stepwise, so that the steady number of pulses per minute is measured under an increasing load until the user indicates that the exercise cannot be continued any longer. Next, a load value corresponding to about 70% of the number of pulses per minute of the athletic maximum, which is generally called the "athletic optimum number of pulses per minute", is calculated.

The above-described method is accurate; however, it suffers from the drawbacks in that the user must continue exercising until the athletic optimum number of pulses per minute is reached. Practicing this method may, therefore, be hazardous to the user. Also, the measurement takes a relatively long time to complete.

SUMMARY OF THE INVENTION

An object of the present invention is to eliminate the above-described difficulties accompanying a conventional ergometer.

Another object of the present invention is to provide an improved mechanical arrangement for loading a rotor assembly.

A further object of the present invention is to provide a bicycle ergometer with a loading device including an eddy current brake.

Yet another object of the present invention is to provide a loading device for a bicycle ergometer in which substantially constant torque is obtained in the practical range of speed of the loading device and a predetermined load value is obtained by a simple control method.

A further object of the present invention is to provide a method of determining optimum athletic conditions in which a general expression for a load versus number of pulses graph is obtained by utilizing data which are statistically obtained separately according to age.

Still another object of the present invention is to provide a method for determining the load value of a rotary loading device in a manner which is increased stepwise according to the graph and the steady number of pulses per minute in each step is measured to obtain a load versus number-of-pulses approximation line.

A further object of the present invention is to provide a method wherein an optimum load value and a steady number of pulses per minute at that time are obtained in safety and in a short time before the number of pulses per minute of the user reaches the athletic maximum number of pulses per minute.

The foregoing and other objects of the present invention have been achieved by a loading device for a bicycle ergometer comprising a rotor assembly, a stator provided inside the rotor assembly, a plurality of exciting coils provided on the stator, and a power source for energizing the exciting coils. According to the invention, the rotor assembly is made of an iron material with a carbon content of 0.12% or less and a silicon content of 0.35%. The loading device further comprises indicating means for indicating a desired load value, a square root characteristic signal generating circuit for generating a current instruction signal corresponding to the desired load value in response to the output of the indicating means, and a constant current drive circuit provided between the exciting coils and the power source, for controlling the current supplied to the coils in response to the output of the square root characteristic signal generating circuit.

In addition, the above-described and other objects of the present invention have been achieved by the provision of a bicycle ergometer in which the control upper limit and the control lower limit of the number of pulses per minute of a user are calculated by inputting the physical attributes of the user to provide a training range. The number of pulses per minute of the user is measured while the user exercises continuously, so that the number of pulses per minute of the user can be maintained in the training range by adjusting the load as the number of pulses per minute changes. The bicycle ergometer, according to the present invention, comprises inputting means for inputting physical attributes of a user, e.g., age, sex, load, etc., a pulse sensor for measuring the number of pulses per minute of the user, an arithmetic control circuit for calculating a control upper limit number of pulses per minute by utilizing the physical attributes according to a program to provide a training range, and for changing a load value when the output of the pulse sensor provided during the continuous exercise exceeds the training range thus provided, in such a manner that the output is maintained in the training range, and a loading device comprising a rotor assembly made of an iron material with carbon content of 0.12% or less and silicon content of 0.35% or less, a stator provided inside the rotor assembly, the stator having a plurality of exciting coils arranged radially, a characteristic signal generating circuit for generating a square root signal in response to the output of the arithmetic control circuit, and a power source for the exciting coils.

Preferably in the invention, the rotor assembly is a concentric circular structure of two kinds of iron inserted into the outer rotor, the inner rotor being made of materials selected from the group consisting of structural carbon steel pipes (STK and STKM) while the outer rotor is made of cast iron.

In the case where the outer rotor is used merely to give a flywheel effect to the inner rotor, the outer rotor may be made of a non-ferrous material such as cement.

In the eddy current brake designed as described above, the load value is controlled by supplying current to the exciting coils in response to the output signal of the signal generating circuit having the square law characteristic. Therefore, the loading device according to the present invention can provide constant torque without intricate control.

Under the same load, the exciting current of the loading device of the present invention is much smaller than that of the conventional loading device. Therefore, even when the loading device of the invention is used continuously, the quantity of heat generated is small. Accordingly, the loading device can be miniaturized.

According to the method of the present invention, the number of pulses per minute of the user at rest is measured as first data, the steady number of pulses per minute under a first load is measured as second data, the second data is compared with a first reference value which is the steady number of pulses per minute under a first load on a load versus number-of-pulses graph computed from a minimum square law statistical average to determine a second load value. The steady number of pulses per minute under the second load is measured as third data and the third data is compared with a second reference value of the steady number of pulses per minute under the second load on a load versus number-of-pulses graph computed from a minumum square law statistical average provided separately according to sex to determine a third load value. The steady number of pulses per minute under the third load is measured as fourth data, the upper limit of the measured values being limited by the athletically safe number of pulses per minute for the age and sex of the user. When the fourth data is obtained, according to the second through fourth data, and when the athletic safety number of pulses per minute is reached before the fourth data is obtained, according to the first through the third data, a load versus the number-of-pulses approximation graph is obtained and the upper limit thereof is determined from the maximum number of pulses per minute which is calculated for combinations of age and sex, to obtain a load value at about 70% of the maximum number of pulses per minute.

BRIEF DESCRIPTION OF THE DRAWINGS

The nature, principle and utility of the invention will become more apparent from the following detailed description when read in conjunction with the accompanying drawings.

FIGS. 19A, 19B, 20A, and 20B are explanatory diagrams showing physical strength test programs;

FIGS. 24A and 24B are two parts of a flow chart for a physical strength measurement program;

DETAILED DESCRIPTION OF THE PREFERRED EMBODIMENTS

In the course of reducing the present invention to practice, extensive research was conducted on the characteristics of an eddy current brake. It was learned that of the various parameters, specific resistance and permeability of the brake material greatly affect the eddy current brake's characteristics. Flywheels were then manufactured by using various materials selected on the basis of the above described findings concerning specific resistance ($\Omega$·cm) and permeability (H/m) and the measured braking forces and exciting currents of the exciting coils.

Figure 1:
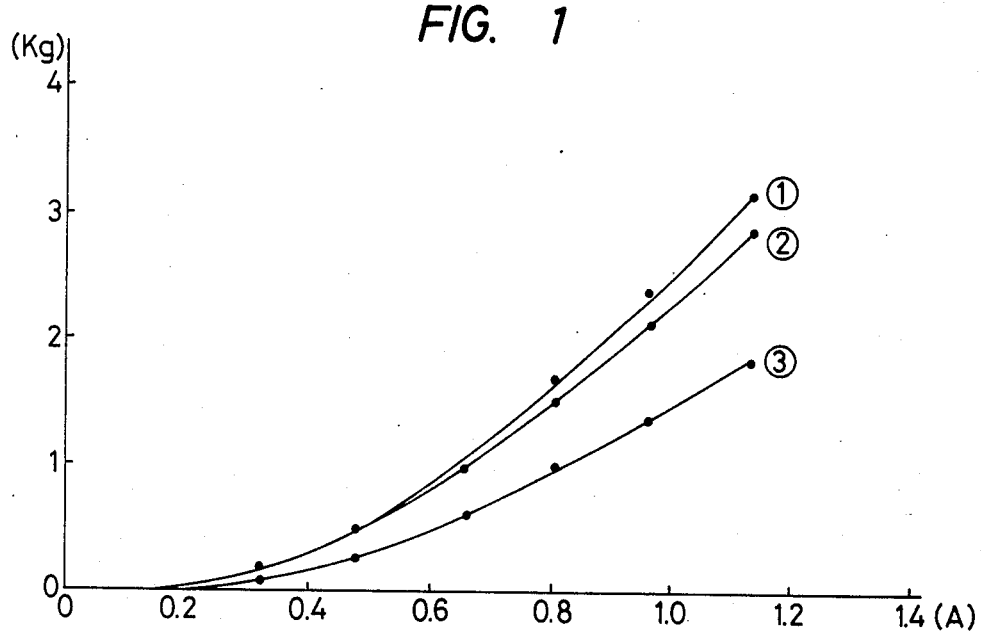
FIG. 1 is a graphical representation of the braking force versus exciting current characteristic curves for flywheels made from different materials.
Figure 2:
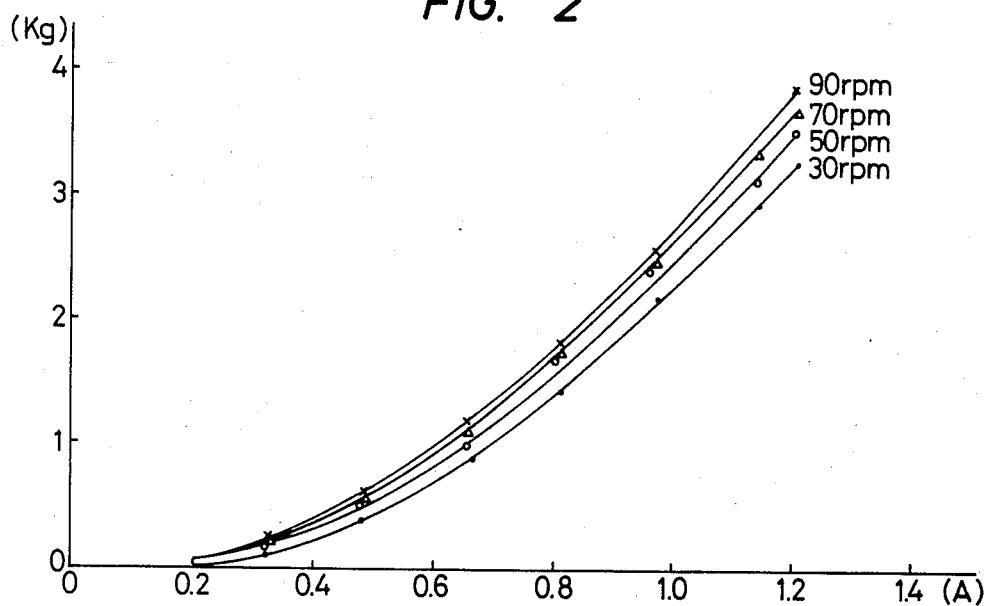
FIG. 2 is a graphical representation of the braking force versus exciting current characteristic curves of pure iron.

The results of measurements are as indicated in FIG. 1. In FIG. 1, reference numerals (1), (2) and (3) designate braking force versus exciting current characteristic curves of flywheels which are made of pure iron, cast iron, and gray cast iron, respectively. When gathering the data, the speed of the pedal of the load device was 50 rpm, and, as the gear ratio was set at fifteen (15), the speed of the flywheel was 750 rpm.

As is apparent from FIG. 1, the flywheel of pure iron is highest in performance, providing a high load force with a small current. The flywheel of cast iron is next best in terms of performance. The flywheel of gray cast iron, which was heretofore used, is much lower in performance than the above-described two flywheels. Thus, it can be said that pure iron or cast iron is more suitable for manufacturing the flywheel.

Next an investigation was conducted into the relationships between the components of these iron materials and the braking characteristics with the following results. The content of silicon (Si) relates to the specific resistance, and as the content of silicon decreases the specific resistance also decreases. On the other hand, the content of carbon affects the permeability, and as the content of carbon decreases the permeability increases. Analysis of the components of the flywheels is as indicated in Table 1 below:

TABLE 1

|  | Pure iron | Cast steel iron | Cast iron | Gray cast iron |
|---|---|---|---|---|
| Carbon | 0.003 | 0.16 | 0.18 | 3.04 |
| Silicon | 0.06 | 0.16 | 0.55 | 2.1 |
| Manganese | 0.20 | 0.53 | 1.50 | 0.65 |
| Phosphor | 0.04 |  | 0.04 | 0.061 |
| Sulfur | 0.04 |  | 0.04 | 0.0088 |

Thus, in fabricating the load device, i.e., the eddy current brake, an excellent characteristic and a large load with small current can be obtained by selecting a specific composition of material for the flywheel. The best characteristic and the maximum load with a small current can be obtained by forming the flywheel from pure iron which, among the iron materials, is lowest in carbon and silicon contents.

However, as it is rather difficult to obtain pure iron at a low price, the flywheel may be manufactured with cast iron which is similar to pure iron in characteristics. The performance of a flywheel thus manufactured has been found satisfactory. In this connection, it has been found that even if, in view of the torque of the flywheel and the availability of material in the market, structural carbon steel pipe (STK or STKM in JIS) is used for the inner member facing the exciting coils, while the outer member is made of gray cast iron for the flywheel effect, the result is substantially equal to that which is provided when the inner and outer member are made of cast iron. Further it should be noted that since the JIS defines only the upper limits for the composition components of structural carbon steel pipe STK or STKM, out of the pipes manufactured as standard pipes one which has the desired contents of carbon and silicon must be selected.

Conventional flywheels made of gray cast iron are referred to as A-type flywheels, and flywheels which have the inner member made of a structural carbon steel pipe STK-50 (C =0.12% or less and Si =0.35% or less) and the outer member made of gray cast iron are referred to as B-type flywheels. The characteristics of these flywheels are compared in FIGS. 3 through 8.

Figure 3:
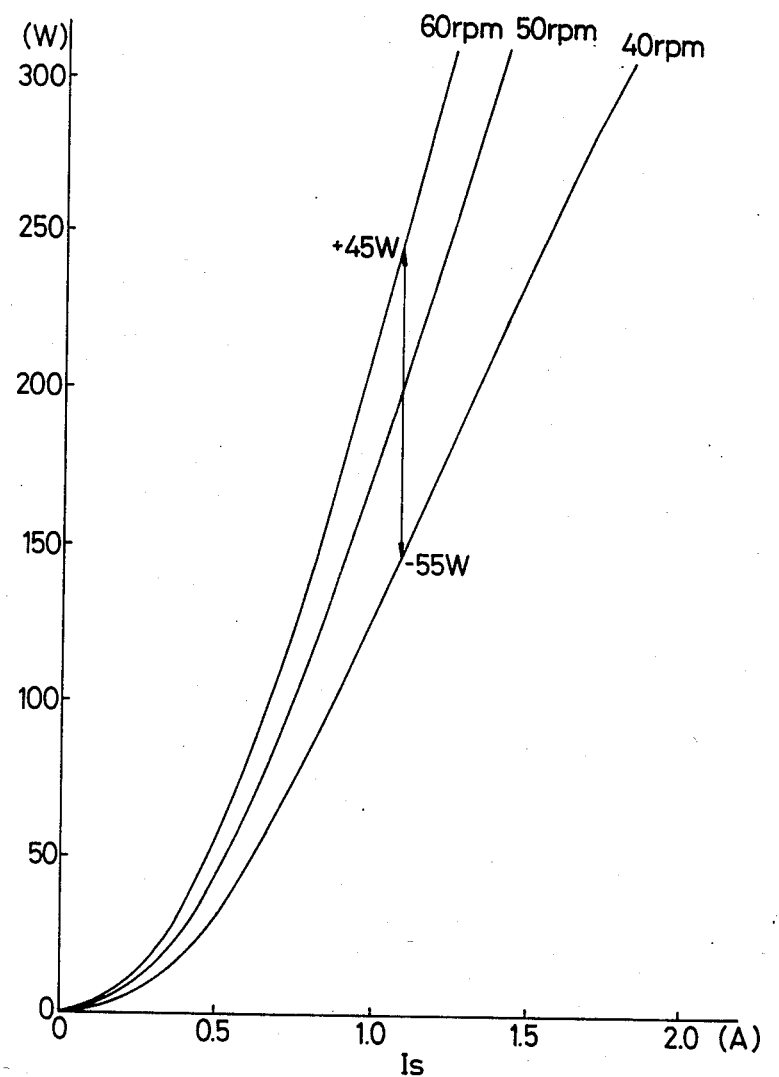
FIG. 3 is a graphical representation of the W versus Is characteristics of a conventional eddy currrent brake.
Figure 4:
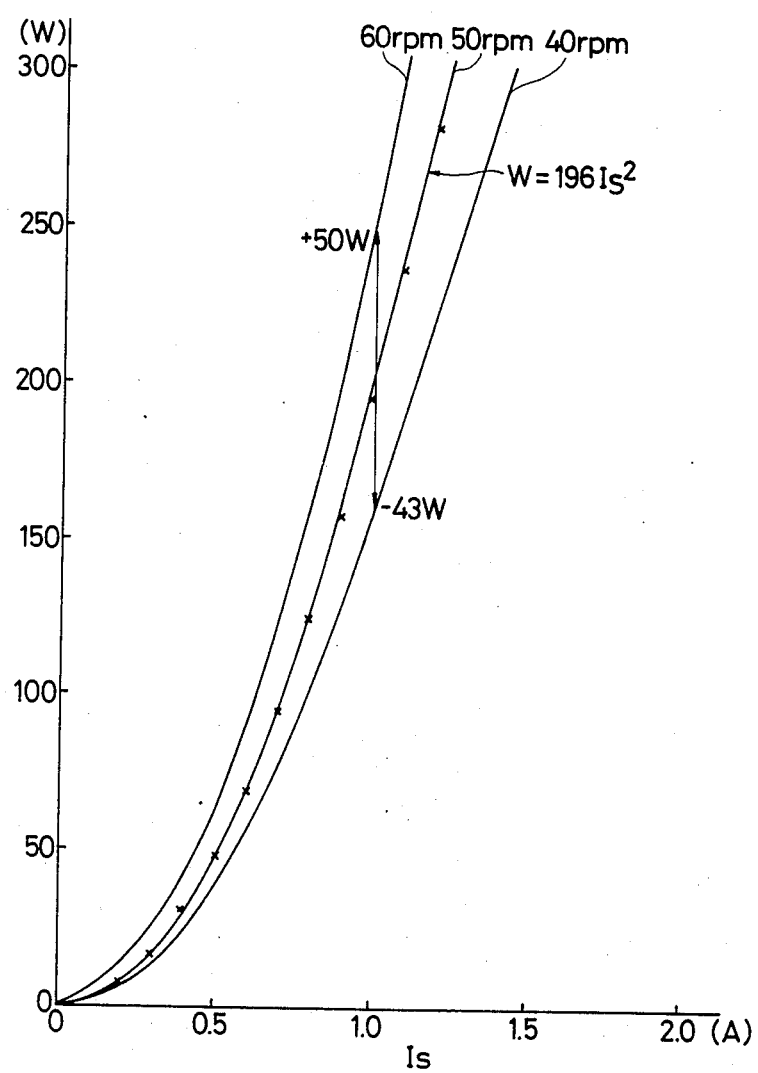
FIG. 4 is a graphical representation of the W versus Is characteristics of an eddy current brake according to the present invention.

FIGS. 3 and 4 show W versus Is characteristic curves of the eddy current brakes of the prior art and of the present invention, respectively. As indicated in FIG. 1, with the same current the flywheel of the present invention provides a larger load. The differences between the loads at different revolutions per minute are less, and the characteristic curves can be approximated by a square curve. Especially in FIG. 3, the curve with 40 rpm is greatly shifted from the other curves.

Figure 5:
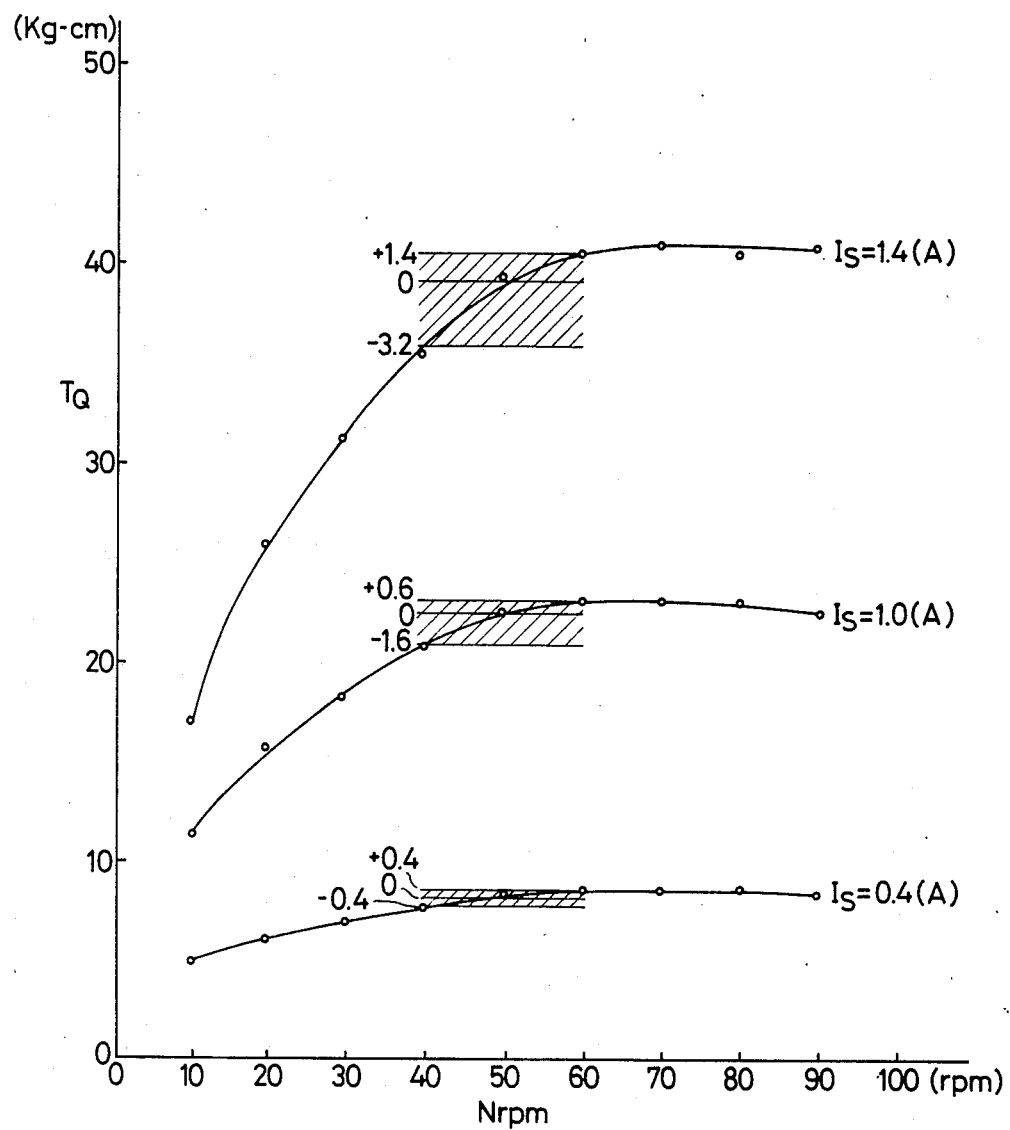
FIG. 5 is a graphical representation of the torque versus speed characteristics of the conventional eddy current brake.
Figure 6:
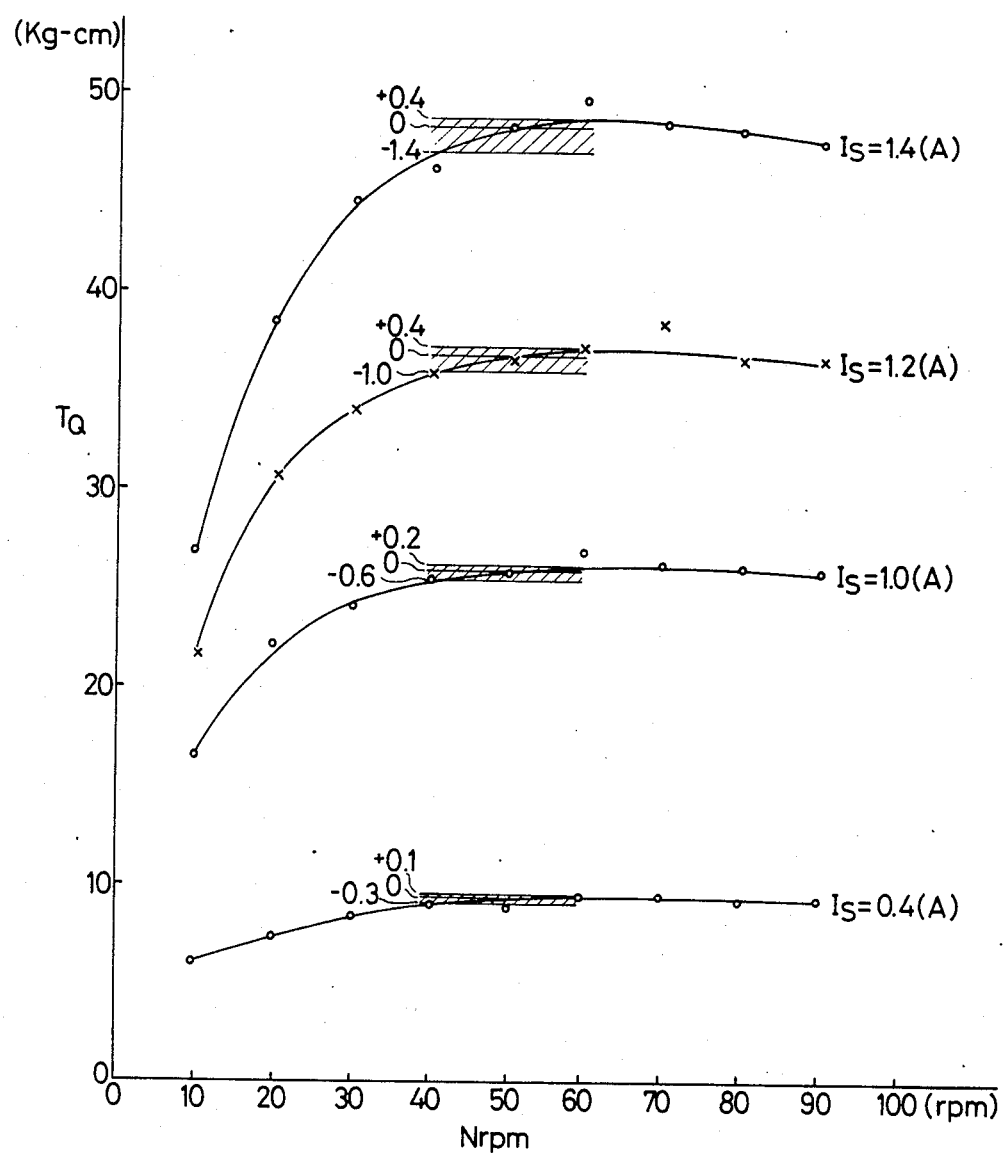
FIG. 6 is a graphical representation of the torque versus speed characteristics of the eddy current brake according to the present invention.

FIGS. 5 and 6 show torque versus revolution per minute characteristic curves of the eddy current brakes of the prior art and the present invention, respectively. Where the range of practical revolutions per minute of the pedal of the load device using the eddy current is 40 to 60 rpm, the range of variation of torque versus current is as indicated in the following Table 2:

TABLE 2

|  | Prior Art | | Invention | |
|---|---|---|---|---|
| 0.4 (A) | +0.4<br>−0.4 | % (8.2 W) | +0.1<br>−0.3 | % (9.4 W) |
| 1.0 (A) | +0.6<br>−1.6 | % (22 W) | +0.2<br>−0.6 | % (26 W) |
| 1.4 (A) | +1.4<br>−3.2 | % (39.2 W) | +0.4<br>−1.4 | % (48.4 W) |

As is apparent from Table 2 above, under the condition that the exciting coil current is constant, the flywheel of the load device according to the present invention is less variable than that of the prior art in the range of practical revolutions per minute of the flywheel's pedal, and provides a higher load.

Figure 7:
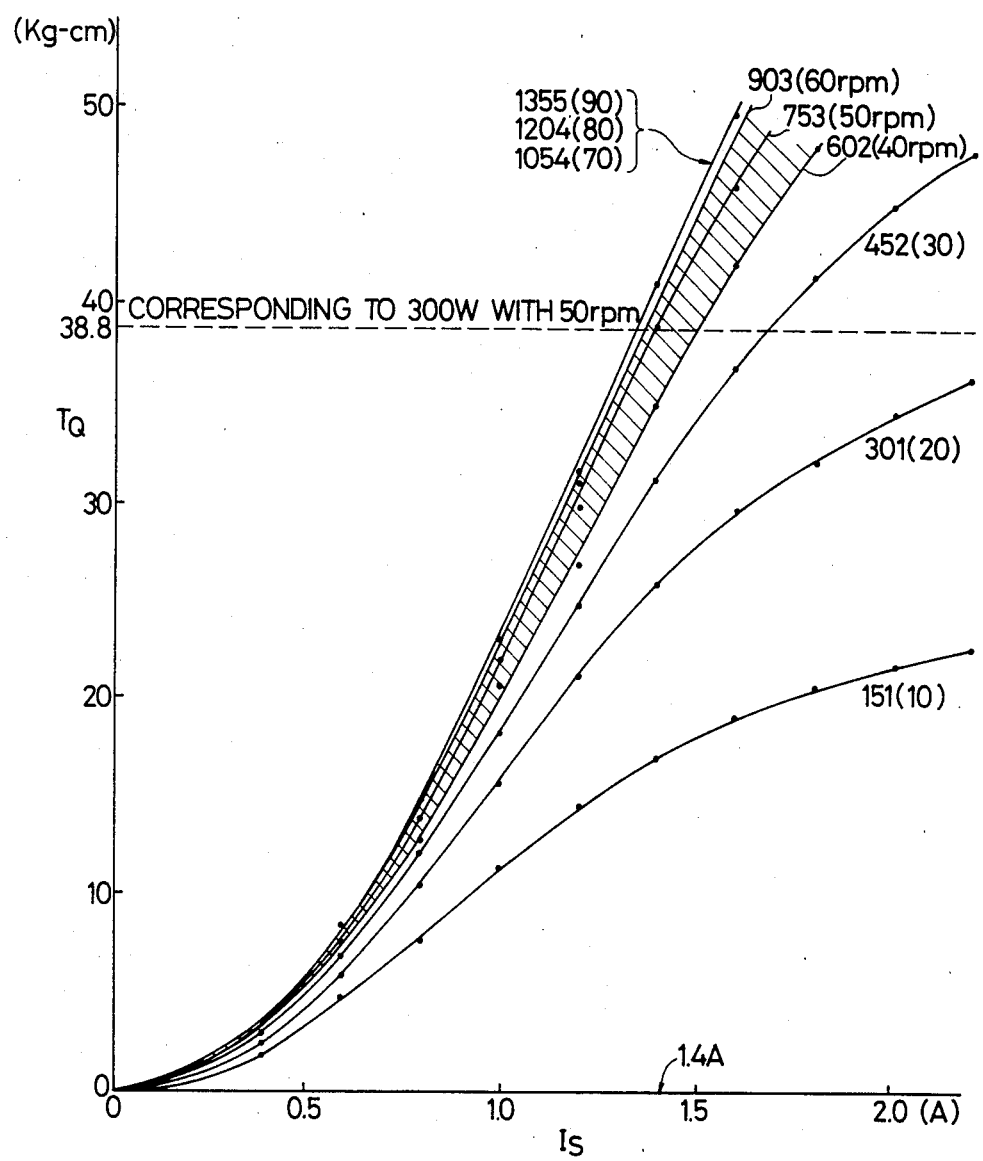
FIG. 7 is a graphical representation indicating the torque versus exciting current characteristics of the conventional eddy current brake.
Figure 8:
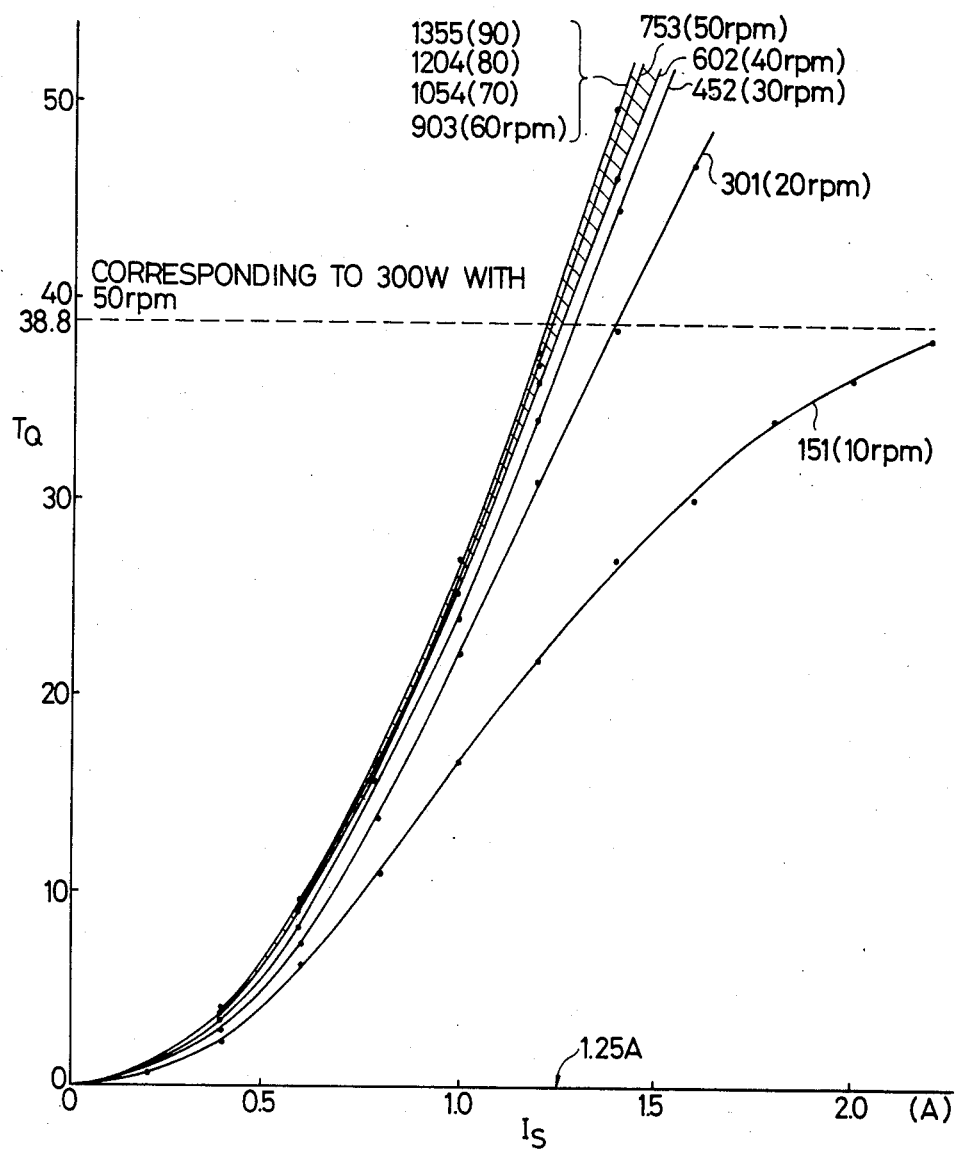
FIG. 8 is a graphical representation of the torque versus exciting current characteristics of the eddy current brake according to the present invention.

FIGS. 7 and 8 shows torque versus exciting current characteristic curves with revolutions per minute as a parameter. In each of FIGS. 7 and 8, a lined part indicates the variations of revolution per minute and torque in the range of practical revolutions per minute, and in the case where it is required to accurately maintain the load constant, the lined part should be compensated for by controlling the current.

If it is assumed that the practical torque is less than 38.8 kg cm corresponding to 300W with 50 rpm, then the lined part in FIG. 8 can be substantially disregarded when compared with the lined part in FIG. 7. This means that the eddy current brake using the flywheel according to the present invention can provide a practical constant torque characteristic substantially with the square-law characteristic of exciting current without compensation by a special externally-provided compensation circuit.

Figure 9:
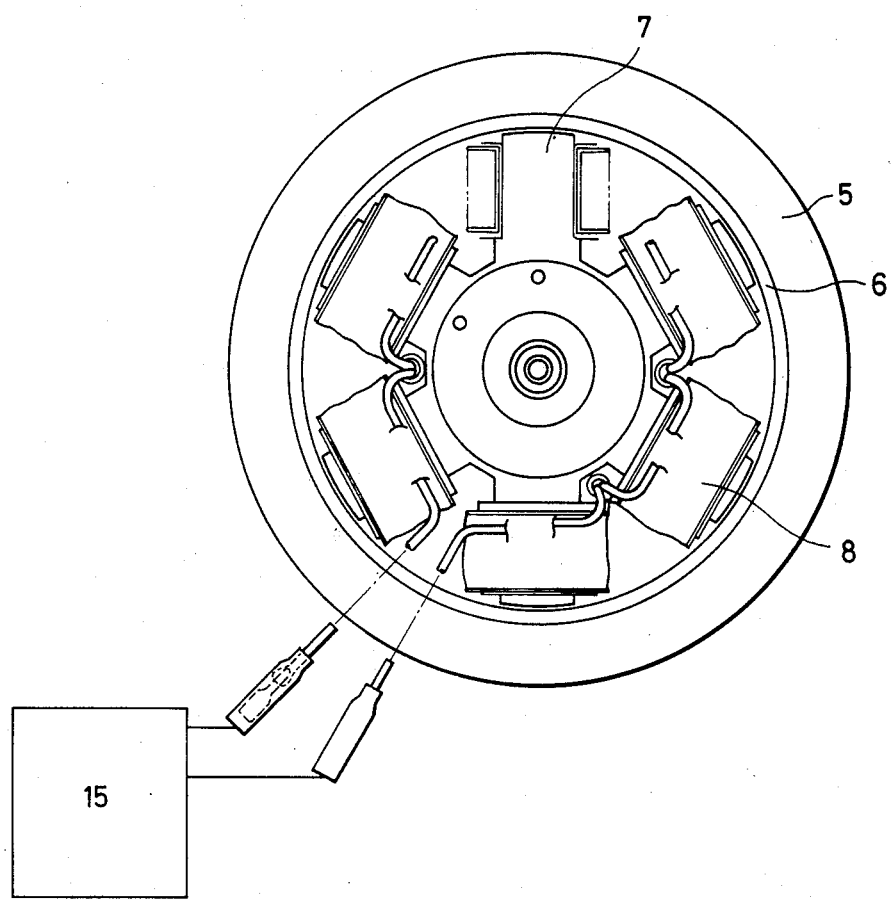
FIG. 9 shows one example of the structure of the eddy current brake according to the present invention.

FIG. 9 shows one example of the eddy current brake according to the present invention. As shown in FIG. 9, the inner rotor 6, made of a structural carbon steel pipe (STK-50), is fitted in the outer rotor 5, made of gray cast iron. Six exciting coils 8 are radially arranged on a stator 7 in such a manner as to confront the rotor 6. The exciting coils 8 are series-connected, and both ends of the series circuit are connected to a power source 15 which is provided externally.

Figure 10:
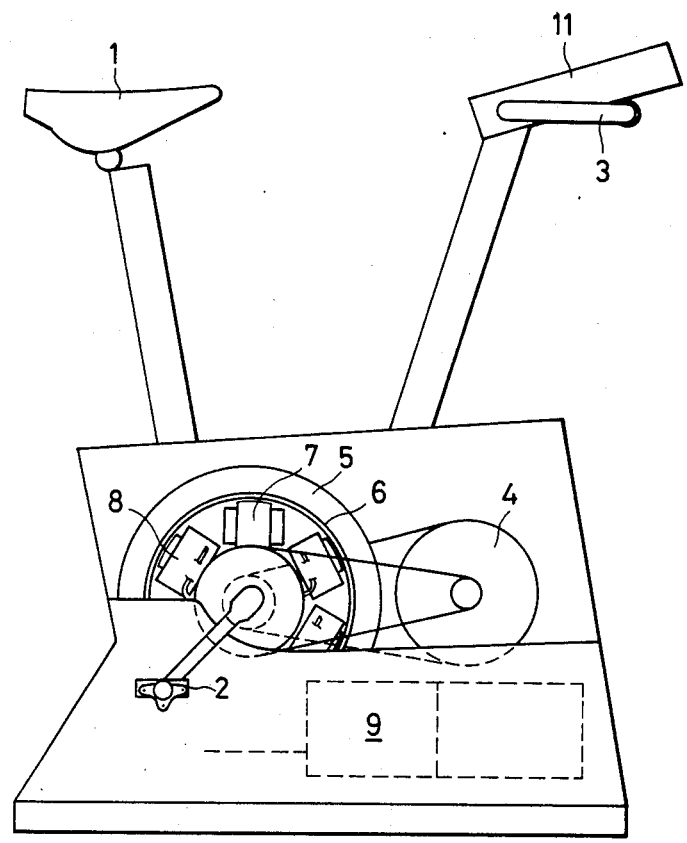
FIG. 10 shows a first example of a bicycle ergometer with a loading device according to the present invention.

FIG. 10 shows a bicycle ergometer equipped with the eddy current brake according to the present invention. In operation, the user mounts on the saddle 1, places his feet on the pedals 2, and grips the handle 3. As he bends and stretches his legs, the pedal driving force is transmitted from the gear on the pedal shaft through a chain or the like to a speed changing unit 4, where it is converted into a suitable value and is then transmitted to the rotor assembly 5 and 6.

The flywheel of the eddy current brake, which is the load device of the bicycle ergometer, is of the dual concentric wheel structure. The flywheel has the outer rotor 5 made of gray cast iron and the inner rotor 6 fitted in the outer rotor 5. The inner rotor 6 is made of structural carbon steel pipe STK-50 containing carbon 0.12% or less and silicon 0.35% or less. A stator 7 is arranged inside the inner rotor 6 in such a manner that it is coaxial with the inner rotor 6. In the case of FIG. 10, six exciting coils 8 are radially arranged on the stator 7. These exciting coils 8 are series-connected, and both ends of the series circuit are connected to a constant current drive circuit 9 so that current is supplied to the exciting coils 8.

The constant current drive circuit 9 comprises a D-A converter for converting a digital value representing a load value specified by operating a ten-key Keyboard on an input/output box 11 into an analog value, a square root function generator 24 for generating the square root of the output of the D-A converter as a supply current instruction value, and a constant current drive unit 23 for controlling the current supplied to the exciting coils 8 in response to the output of the square root function generator. The constant current drive circuit is connected to a power source 22 for energizing the exciting coils.

Figure 11:
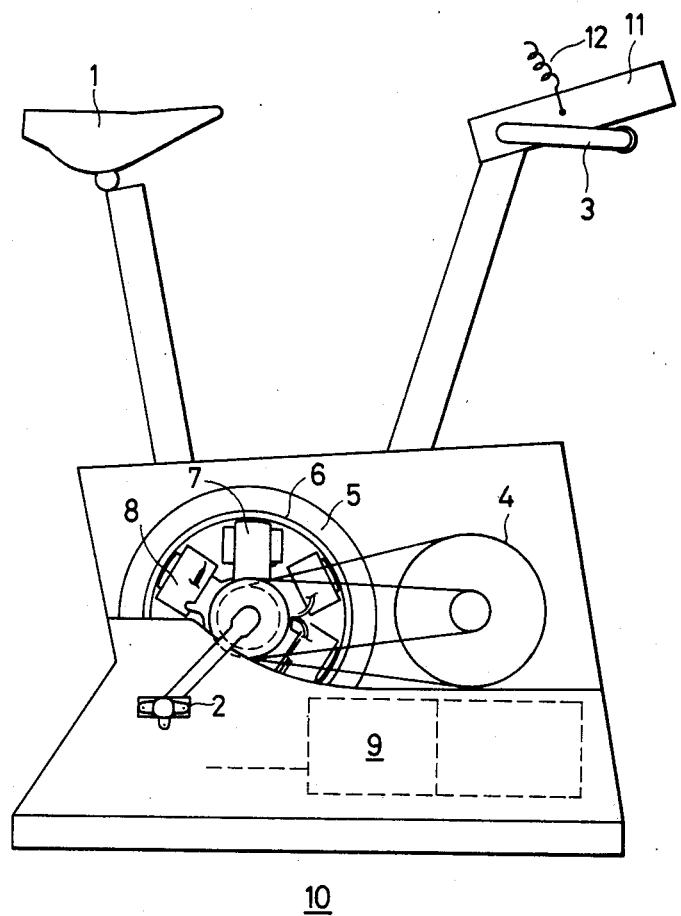
FIG. 11 shows a second example of a bicycle ergometer according to the present invention.
Figure 13:
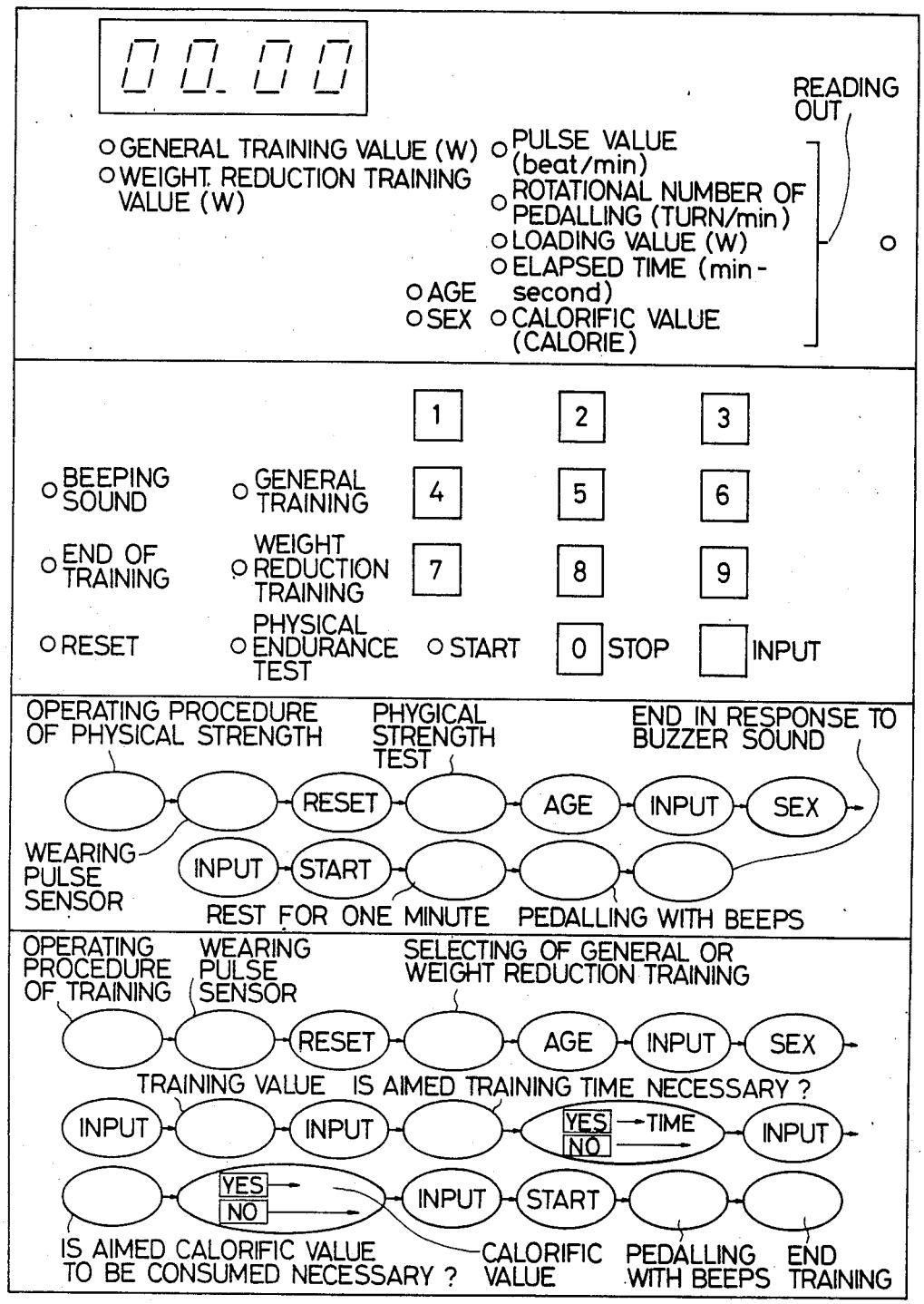
FIG. 13 shows the front panel of an input/output box of the bicycle ergometer shown in FIG. 11.

FIG. 11 shows another example of the bicycle ergometer according to the present invention, illustrating a part of its load device. FIG. 13 shows the front panel of an input/output box 11 in FIG. 11.

The user mounts the saddle 1 of the bicycle ergometer 10 and wears on his ear a pulse sensor 12 extending from the side of the input/output box 11. Under this condition, the user operates the keys of the box 11 according to a training procedure indicated on the lower part of the front panel in FIG. 13. After attaching the pulse sensor 12 to an ear, the user depresses a reset key and selects a desired training program, i.e., a general training program or a weight reduction training program indicated in the middle part of the front panel. Then, the user's physical attributes such as age and sex, and a training value are entered by operating the ten-keys provided on the middle part of the front panel 11. If necessary, an aimed training time and an aimed caloric value to be consumed can also be entered.

After depressing the start button, the user's feet are placed on the pedals 2 and the legs are bent and stretched while the handle 3 is held with hands. This drives the load device and begins training.

The pedal driving force is transmitted from the gear on the pedal shaft through a chain or the like to a speed changing unit 4, where it is changed into a suitable value and then transmitted through a belt or the like to the rotor assembly 5 and 6 of the load device using the eddy current brake of the present invention. Thus, the user can perform the training procedure according to the load value, and the aimed training time and/or the aimed caloric value to be consumed which have been inputted from the front panel in FIG. 13.

Figure 12:
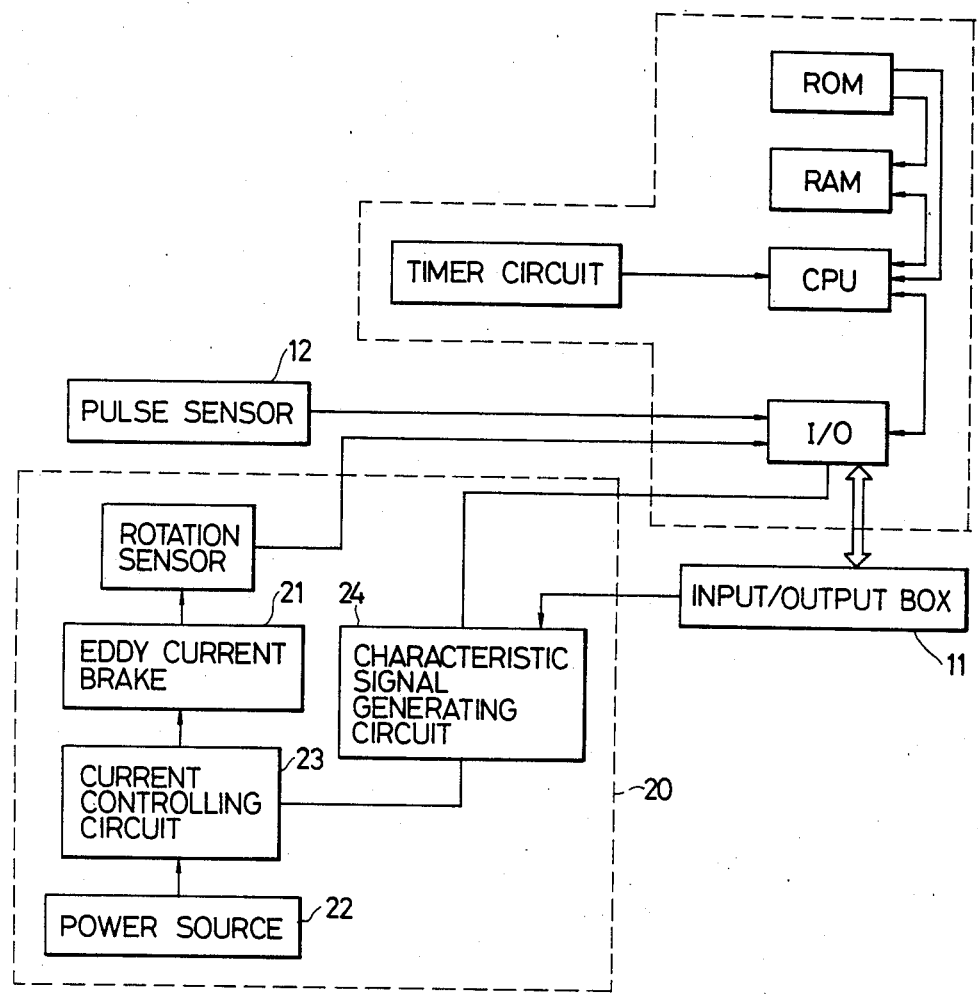
FIG. 12 is a block diagram showing a microcomputer and the loading device of the bicycle ergometer shown in FIG. 11.

An arithmetic control method for the bicycle ergometer in FIG. 11 will be described with reference to FIGS. 12 and 13.

In the bicycle ergometer of the present invention, according to the age, sex, and load value inputted from the front panel and the training program selected, the upper limit control number of pulses, the lower limit control number of pulses, an initial load value with respect to the load value inputted, and an applied load value which is used for warm up, i.e., until three minutes have passed from the start of the training, are all determined.

Data inputted through the input/output box 11 are stored in the RAM in the microcomputer. Upon depression of the start switch, a general equation for obtaining a maximum number of pulses for a given age (220 - 0.7×age for male, and 215 -0.7×age for female) stored in the ROM is transferred into the CPU. Using this equation, the maximum number of pulses is calculated according to the age of the user that has been previously inputted. Then, according to the selection of general training or weight reduction training, the upper limit control number of pulses and the lower limit control number of pulses are calculated (in the case of general training, the maximum number of pulses -55 (upper limit) and the maximum number of pulses -65 (lower limit); and in the case of the weight reduction training, the maximum number of pulses - 70 (upper limit) and the maximum number of pulses -80 (lower limit).

The bicycle ergometer according to the present invention has a program for physical endurance measurement. Therefore, all of the aforementioned data can be obtained by performing the necessary physical endurance measurements in advance.

One example of a method of obtaining the above-described data by performing the physical endurance measurement is as follows. First, the number of pulses of the user at rest is measured as a first data element. Next, the steady number of pulses under a first load is measured as a second data element, and it is compared with a first reference value which is the steady number of pulses under the first load on the minimum square law average load versus number-of-pulses graph which is statistically obtained separately according to sex, to determine a second load.

Next, the steady number of pulses under the second load is obtained as a third data element, and it is compared with a second reference value which is the steady number of pulses under the second load on the minimum square law average load versus number-of-pulses graph, which is statistically obtained separately according to sex, to determine a third load.

Next, the steady number of pulses under the third load is measured as a fourth data element, and its upper limit is limited by the number of pulses for athletic safety which is calculated according to age and sex. When the fourth data element is obtained, according to the second, third and fourth data element, and when the number of pulses for athletic safety is reached before the fourth data elements is obtained, according to the first, second and third data, a load versus number-of-pulses approximate graph is obtained and its upper limit is limited by the maximum number of pulses which is calculated for the age and sex of the user.

Finally, the value obtained by subtracting fifty-five (55) from the maximum number of pulses is determined as the upper limit control number of pulses, and a second value obtained by subtracting sixty-five (65) from the maximum number of pulses is determined as the lower limit control number of pulses. These numbers of pulses are used in general training. In this case, the optimum load value corresponds to the lower limit control number of pulses.

In the case of weight reduction training, for instance in the case where an overweight person intends to maintain or increase his physical endurance and to reduce his weight, a value obtained by subtracting seventy (70) from the maximum number of pulses is used as the upper limit control number of pulses, and a value obtained by subtracting eighty (80) from the maximum number of pulses is used as the lower limit control number of pulses. A load value corresponding to the lower limit control number of pulses is employed as the optimum number of pulses, as in the general training.

When the output of the pulse sensor reaches the load control condition (control pulse range) during warm-up, the load control is given priority. In succession, the following methods are carried out: (1) When the lower limit control number of pulses is reached within a predetermined period of time after the start, the load is decreased as by a suitable value; (2) When the upper limit control number of pulses is exceeded within a predetermined period of time after the start, the load is immediately decreased by a suitable value; and (3) When the lower limit control number of pulses is not reached within a predetermined period of time after the start, the load is increased by a suitable value. When a certain period of time passes after a load decrease or increase, the same decision process is repeated.

In this manner, the number of pulses per minute for a user is maintained in the range of the control number-of-pulses by repeatedly increasing and decreasing the load.

This training is continued until the selected training time has passed or until the caloric value consumed by exercise (which is calculated below) reaches the selected caloric value to be consumed.

The caloric value consumed can be calculated as follows: The load value is sampled every thirty seconds from the start of the training. Then, the value of calories consumed every thirty seconds is obtained from the following general equation:

$$E = \text{load value (W)} \times 0.014 \text{ (Kcal/min)} \times 1/0.233$$

(bicycle athletic efficiency) × time (minutes)

Figure 14:
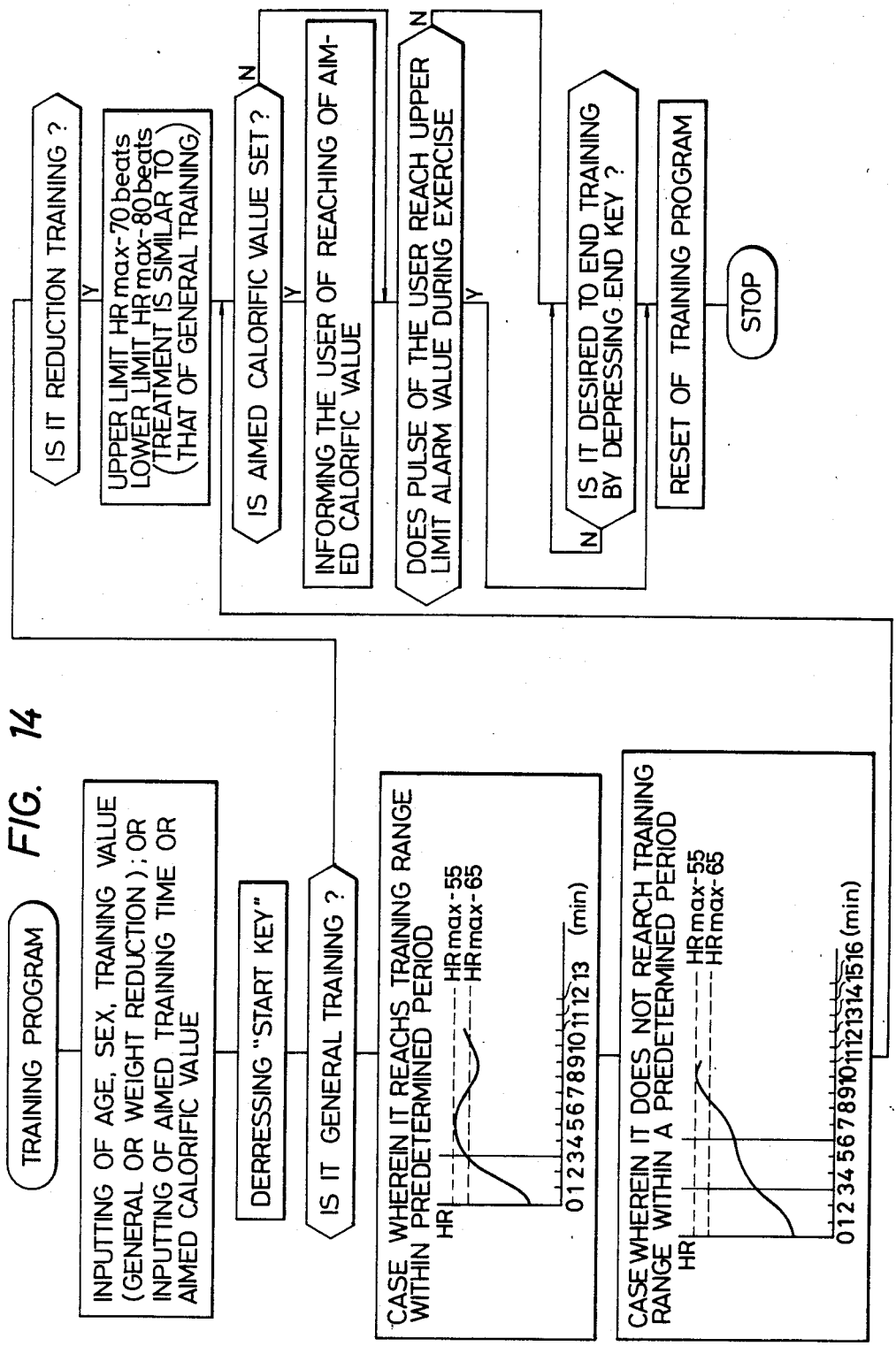
FIG. 14 is a flow chart of the operation of the bicycle ergometer shown in FIG. 11.

The caloric values obtained are integrated to the end of the training. The above-described training is indicated in the flow chart of FIG. 14.

In the above-described embodiments, the load device uses the eddy current brake of the present invention. The electrical circuit of the load device, as shown in FIG. 12, comprises: a power source 22 for supplying current to the eddy current brake 21; a current controlling circuit 23 connected between the eddy current brake 21 and the power source 22, to control the current; and a characteristic signal generating circuit 24 for supplying the square root of the load value (W), as an instruction value, to the current controlling circuit 23 which is specified by operating the ten-keys of the input/output box 11.

The instruction from the input/output box 11 is applied through a D-A converter (I/0) to the characteristic signal generating circuit 24 when it is a digital signal, and it is applied directly to the circuit 24 when it is an analog signal.

As is apparent from the above description, in the load device of the ergometer according to the present invention, the composition of the material of the flywheel in the eddy current brake, i.e., the contents of carbon and silicon are set to the predetermined values or less, to provide a much improved constant torque characteristic than that of the prior art. As a result, the control current characteristic can be substantially approximated by the square-law characteristic. Accordingly, in the invention, unlike the prior art, it is unnecessary to use an intricate control method. The load device can be controlled in the range of practical numbers-of-revolutions of the pedal with the aid of a signal which is only based on the square root of the value specified by the input means. Furthermore, the load provided by the eddy current brake of the load device according to the present invention is higher than that provided by a conventional one when the control currents are the same.

The amount of heat generated is small, and it is unnecessary to take the radiation of heat into account. Thus, the device can be made smaller in size. In addition, the outer rotor of the flywheel is made of gray cast iron and the inner rotor is made of structural carbon steel pipe. Both of these materials are readily available at favorable prices.

In the invention, the stator is provided inside the rotor assembly; that is, the heat generating element is rotated. Accordingly, the heat generated is radiated by convection as the rotor assembly rotates. The outer rotor may be made of non-ferrous material such as concrete so that it serves merely to give a flywheel effect to the inner rotor.

If a torque detecting means, such as a strain meter is added in such a manner that its output is inputted to a microcomputer for correction, then an accurate bicycle ergometer having the above-described specific features can be provided.

A method of determining an optimum athletic condition will be described as another embodiment of the invention in detail. Several terms are defined as follows:

Steady number of pulses:

The number of pulses per minute which is constantly maintained under a predetermined load represented by the average number of pulses per minute which is obtained two minutes after the predetermined load has been applied.

Maximum number of pulses:

The maximum number of pulses per minute of an individual corresponding to the maximum quantity of oxygen taken in. It can be determined substantially from the following expressions:

For male : 220 - 0.7×age
For female: 215 - 0.7×age

Athletic optimum number of pulses:

It is generally about 70% of the maximum number of pulses. A load value at the athletic optimum number of pulses on the load versus number-of-pulses graph is called the "optimum load value."

Athletic safety number of pulses:

It is generally obtained by subtracting a predetermined number (45) from the maximum number of pulses. In general, with the athletic safety number of pulses the person can continuously exercise without fear of physical harm.

Athletic maximum number of pulses:

The maximum number of pulses per minute for the person to exercise. At the athletic maximum number of pulses, the individual can exercise for only a very short time. It is generally obtained by subtracting a predetermined value (25) from the maximum number of pulses. Physical endurance tests were given to many persons for generalization of the load versus number-of-pulses line of a man. In the measurement, the ergometer made by the Monach Company, which is known as means for allowing a person to bend and stretch his legs to give a load, was used. The load was increased stepwise so that more than one value between the athletic maximum number of pulses and the athletic safety number of pulses was measured for the upper limit number of pulses. The load versus number-of-pulses graphs of these persons were prepared.

Figure 15:
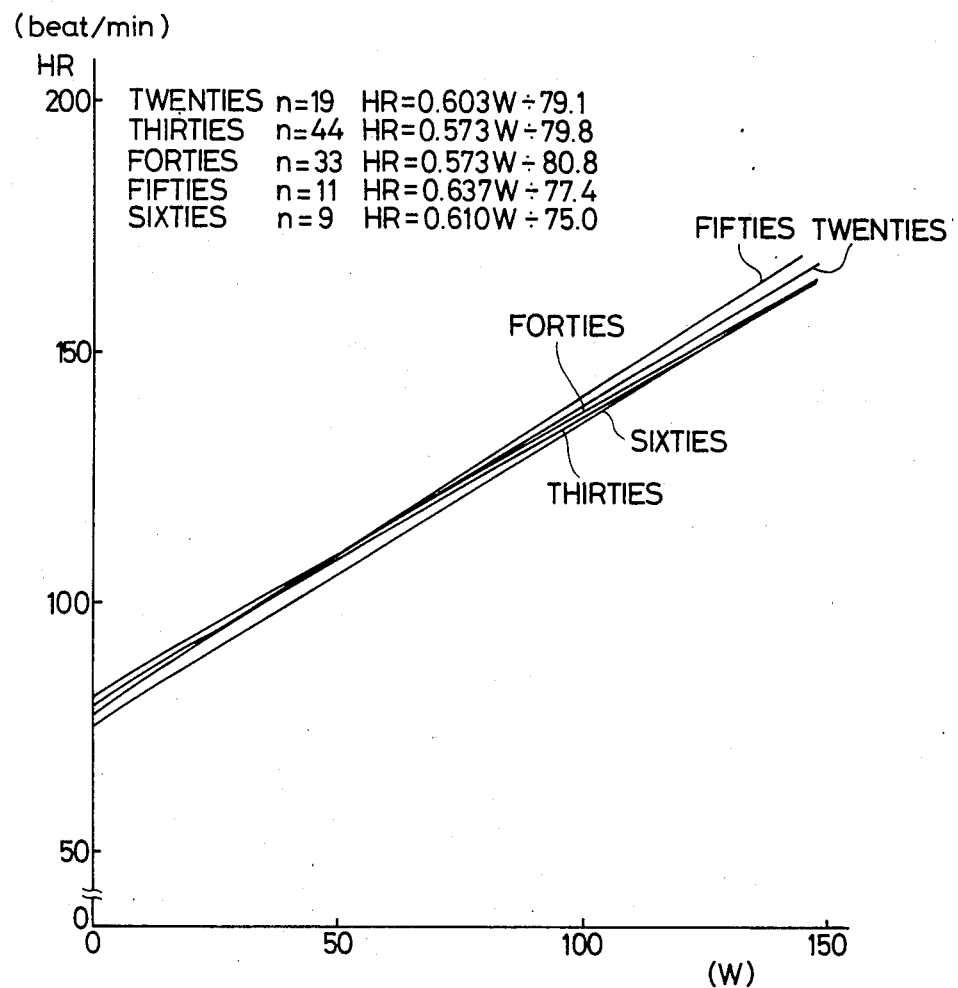
FIGS. 15 through 18 are graphical representations indicating minimum square law average load versus number-of-pulses characteristic graphs provided separately according to age and sex.
Figure 17:
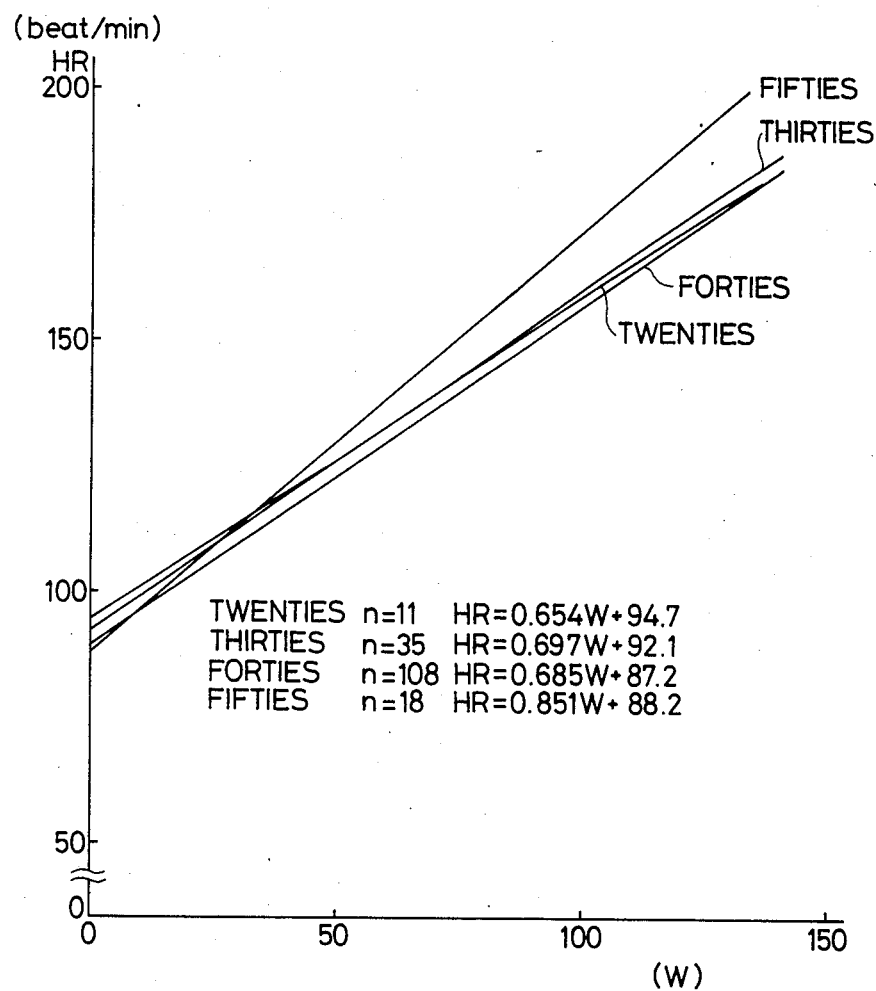

In addition, minimum square-law average load versus number-of-pulses graphs were prepared separately according to ages (ten-years per step) and sexes. These lines are as shown in FIG. 15 (male) and FIG. 17 (female). As is apparent from these Figures, the load versus number-of-pulses graphs regressed by the minimum square-law average of the ages are not greatly different from one another. The women in the fifties age group exhibited a rather large increase in the number of pulses with respect to the increase of the load when compared with those of the other age groups. Thus, it can be understood that in the measurement of physical endurance age is not an essential factor.

In order to investigate the physical endurance differences caused by age, a number of pulses smaller than the athletic safety number of pulses and the load value at that time (109 beats and 50 W for male and 107 beats and 25 W for female) were used as reference values. A person having a number of pulses smaller than the reference value under the load was classified as a high physical endurance person (H).

Figure 16:
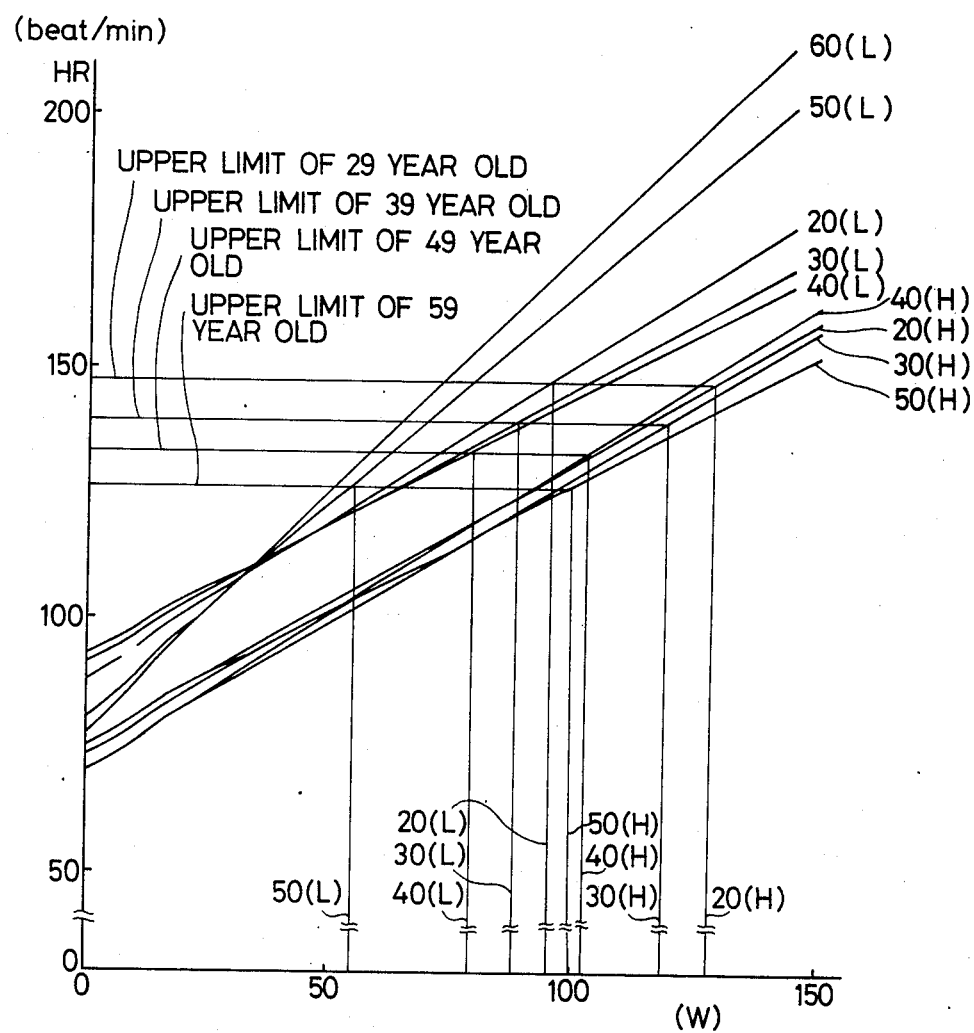

A person having a number of pulses equal to or larger than the reference value was classified as a low physical endurance person (L). The data was used to prepare the load versus number-of-pulses graphs separately according to the high and low physical endurances which were computed by the minimum square-law averages according to ages and sexes. These graphs are as indicated in FIG. 16 (male) and in FIG. 18 (female).

As is apparent from these Figures, the characteristic graphs of the high and low physical endurance persons of the same age are in parallel with each other, and the characteristic graphs of the physical endurance persons provided separately according to ages are substantially equal to one another. (The characteristic graphs of the low physical endurance men of the fifties and sixties and those of the low and high physical endurance women are slightly different, being larger in inclination.)

Accordingly, generally taking the information set forth in FIGS. 15 through 18 into consideration, it can be understood that in the measurement of physical endurance, the physical endurance difference of an individual is a parameter more important than age. In the measurement of the physical endurance difference, first the initial load is set to a suitable value, and the steady number of pulses is measured under the initial load. The result of that measurement is compared with the number of pulses which is provided at the initial load value on the load versus number-of-pulses graph which is obtained by referring to FIGS. 15 through 18, so as to determine whether the physical endurance of the person under measurement is high, low, or average. Since an average physical endurance person is ranked between the high physical endurance person and the low physical endurance person, the characteristic graph of the average physical endurance person can be approximated by that of the high or low physical endurance person.

In general, the load versus number-of-pulses graph can be determined by obtaining at least three load values, preferably more than two load values, and its upper limit (maximum number of pulses) can be readily obtained according to age and sex. In this case, it is preferable to measure at least three kinds of numbers of pulses except for the number of pulses which is obtained when at rest. Accordingly, referring to the characteristic graphs obtained from these Figures, the maximum load value with the athletic optimum number of pulses was limited and physical endurance measuring programs within the range as shown in FIGS. 19 and 20 were prepared.

In FIG. 19A, the first load is set to 25W, and the decision reference number-of-pulses 90 is selected from the range of steady number of pulses $HR_{25}=90-95$ under a load of 25W. Next, the second load is set to 50W and 65W. The steady numbers of pulses at these points in FIG. 16 are 118 –127 (L class) and 108–112 (H class), respectively. According to these values, 120 and 110 are selected as the second reference values. Even when the maximum number of pulses is 190 for the twenties (29 years old), 182 for the thirties (39 years old) and 175 for the forties (49 years old), the athletic optimum number of pulses (about 70%) and the athletic safety number-of-pulses (- 45) are taken into consideration. The three load values and the reference numbers of pulses are in the range.

Figure 19B:
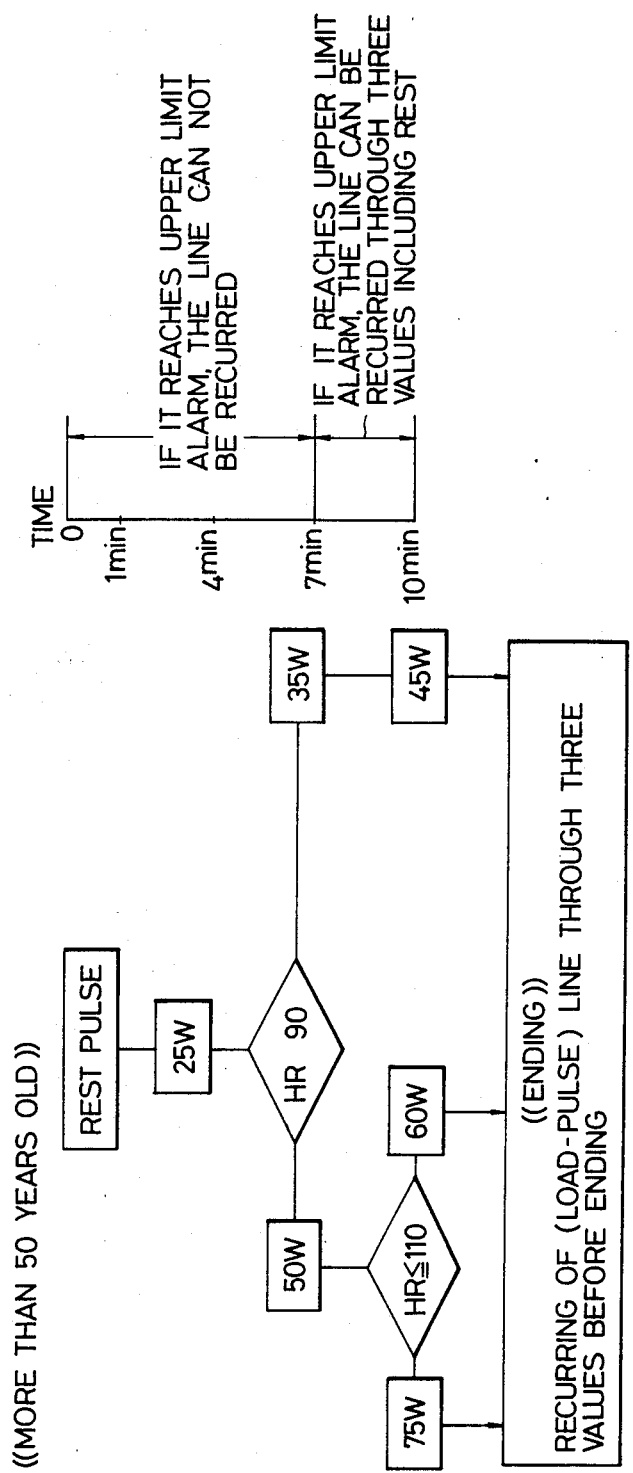

In FIG. 19B, as the characteristic graphs of the low physical endurance persons of the fifties and the sixties are steep, although the first load value and the reference value remain the same, the second load values are reduced to 35W and 50W. The reference steady number persons were simulated. The results of simulation are as indicated in Table 3 (male) and in Table 4 (female).

TABLE 3

|  | 20 to 49 years old (96 persons) | | | 50 years old and older (19 persons) | | | Total (115 persons) | | |
|---|---|---|---|---|---|---|---|---|---|
| (a) Person for whom the test is accomplished in ten minutes and the regression line is obtained. | 94 persons | 98% | 99% | 16 persons | 84% | 100% | 110 persons | 96% | 99% |
| (b) Persons for whom the upper limit alarm is operated in seven to ten minutes, but the line is obtained through regression including rest. | 1 person | 1% | | 3 persons | 16% | | 4 persons | 3% | |
| (c) Persons for whom the upper limit alarm is operated in less than seven minutes, and the regression line cannot be obtained. | 1 person | 1% | 1% | 0 person | | 0% | 1 person | 1% | 1% |

TABLE 4

|  | 20 to 49 years old (154 persons) | | | 50 years old and older (18 persons) | | | Total (172 persons) | | |
|---|---|---|---|---|---|---|---|---|---|
| (a) Persons for whom the test is accomplished in ten minutes and the regression line is obtained. | 130 persons | 84% | 92% | 7 persons | 39% | 72% | 137 persons | 80% | 90% |
| (b) Persons for whom the upper limit alarm is operated in seven to ten minutes, but the line is obtained through regression including rest. | 12 persons | 8% | | 6 persons | 33% | | 18 persons | 10% | |
| (c) Persons for whom the upper limit alarm is operated in less than seven minutes, and the regression line cannot be obtained. | 12 persons | 8% | 8% | 5 persons | 28% | 28% | 17 persons | 10% | 10% | of pulses under 50W is set to 110 similarly as in the case of FIG. 19A. Load values applied to the low physical endurance person are incremented in 10W levels, and the reference steady number of pulses is the athletic optimum number of pulses.

Figure 20A:
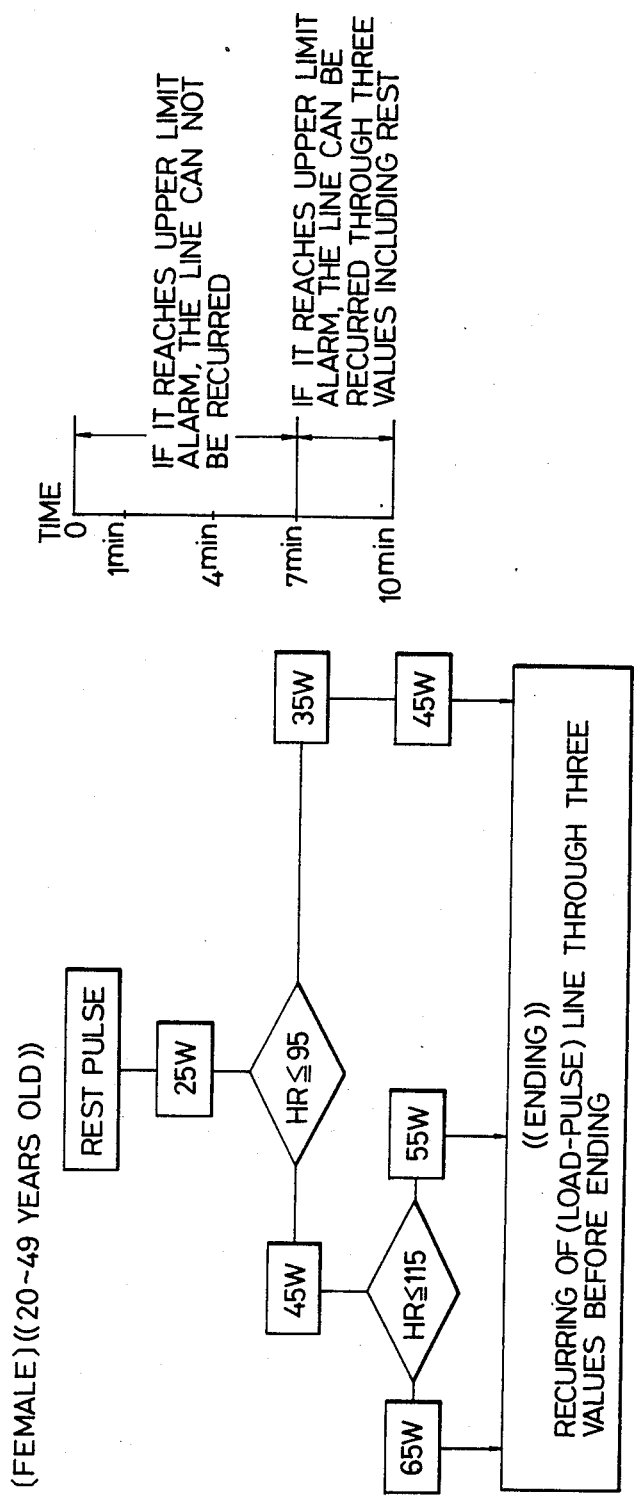

In FIG. 20A, as the characteristic graphs of women are steeper than those of men and the rest number-of-pulses of women is higher, the initial load value is set to 25W, the reference steady number of pulses at that time is set to 95, and the second load values are set to 35W and 45W. The reference values of a high physical endurance person under the second load values are set to 55W and 65W. As for the load values for the low physical endurance person, 35W and 45W, ranged in 10W steps from the first load value, are set as the second and third load values. The uppper limit number of pulses for the low physical endurance person is limited by the athletic optimum number of pulses.

Figure 18:
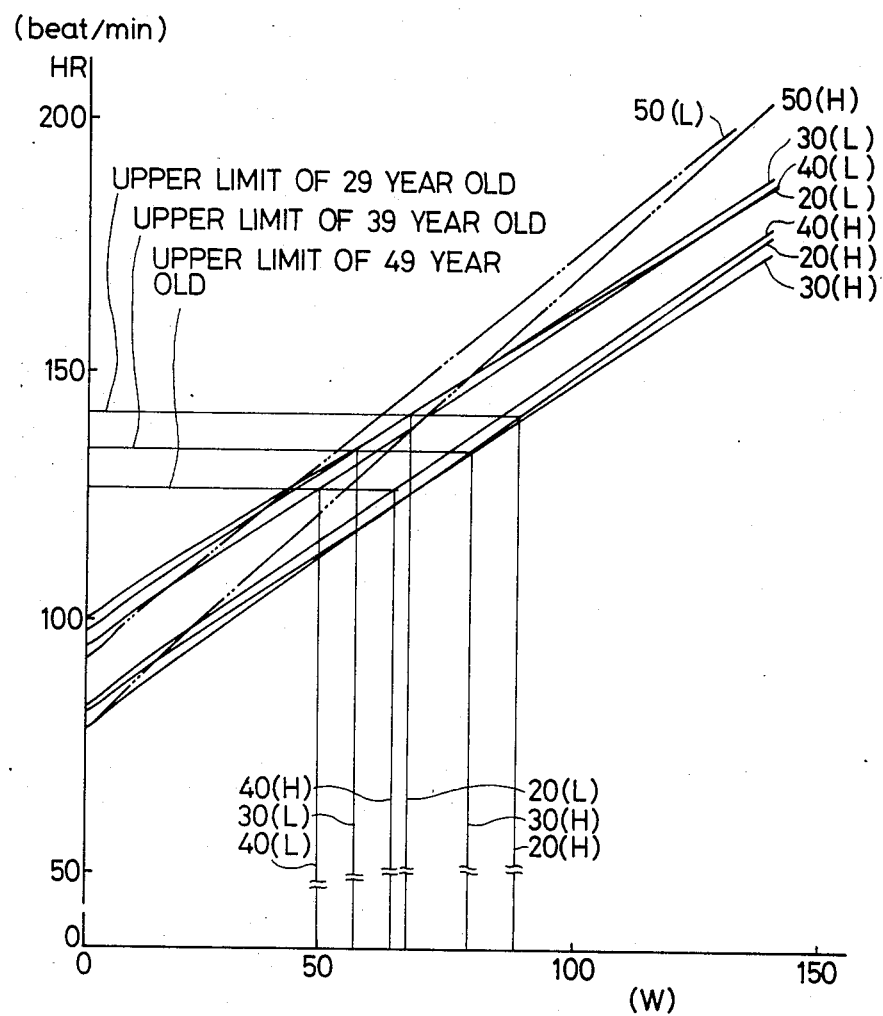
Figure 20B:
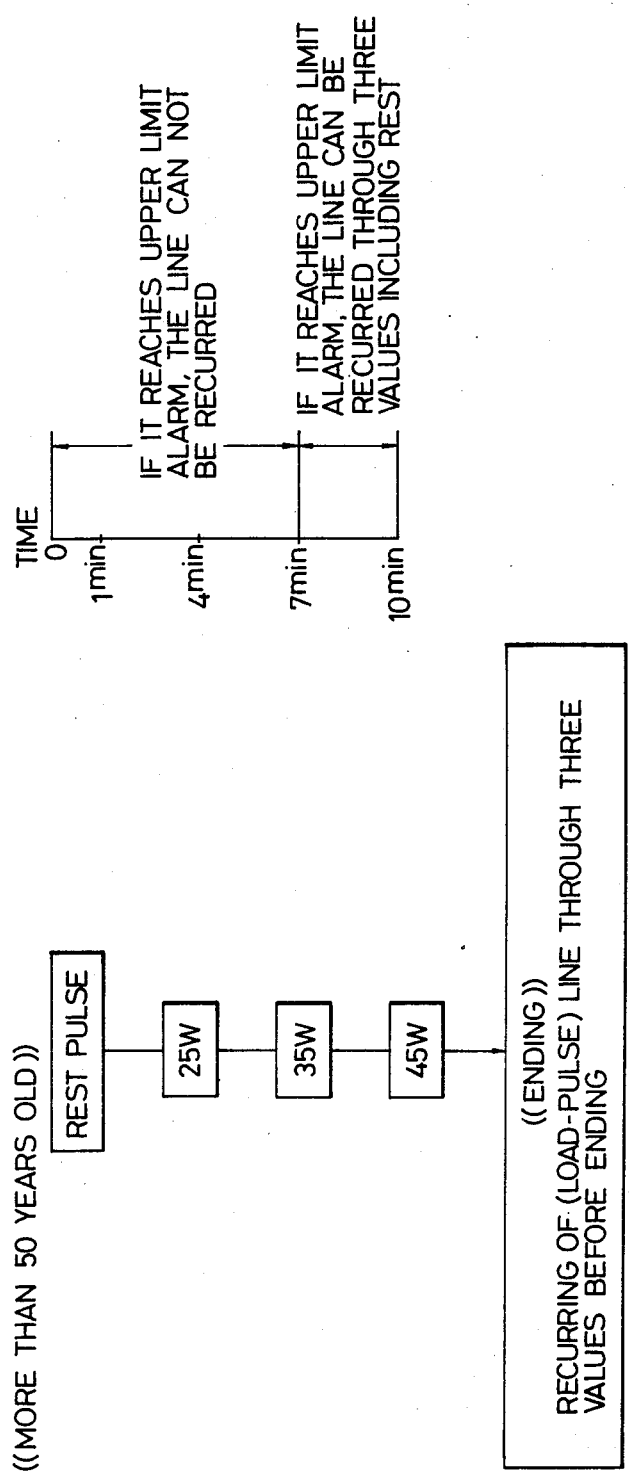

In FIG. 20B, as the characteristic graphs are steep as shown in FIG. 18, according to the characteristic graphs, the load values are provided at intervals of 10W similarly as in the case of the low physical endurance person in FIG. 20A, and the upper limit number of pulses is limited by the athletic optimum number of pulses.

Based on the physical endurance measuring programs which were provided according to FIGS. 19A, 19B, 20A and 20B, the load versus number-of-pulses of the As is indicated in Table 3, only one male person could not regress to his load versus number-of-pulses graph according to the program. Therefore, it can be said that the program can be used for measuring the physical endurance of almost all male persons and for obtaining the athletic optimum load values and the steady numbers of pulses.

In Table 4, twelve persons (8%) 20 to 49 years old could not regress to the respective load versus number-of-pulses graphs according to the program, and five persons (28%) 50 years old or older could not. Upon investigation of the data of these persons, of the twelve persons twenty to forty-nine years old, seven persons reached the athletic optimum number of pulses under the load of 25W, and the remaining five persons reached the athletic optimum number of pulses under the load of 35W. This cannot be approximated by the general expression or by changing the load value. Of the five persons fifty years old or older, three persons reached the athletic optimum number of pulses under the load of 25W, and the remaining two persons reached the athletic optimum number of pulses under the load of 35W. The same thing can be said about these person.

The contents of FIGS. 15 through 20 indicate the fact that the physical endurance measuring programs shown in FIGS. 19A, 19B, 20A, and 20B can be used for obtaining the athletic optimum load values and the steady number of pulses for almost all persons without increasing the load values to those which provide the athletic maximum numbers of pulses (or the athletic optimum numbers of pulses for persons twenty to forty-nine years old). When the load versus number-of-pulses graph has been obtained, the load value PWC 130 or 150 with the number of pulses 130 or 150, which is employed as a general physical endurance evaluating value, can be readily obtained from the line.

The programs of the present invention will be described with reference to another example of the bicycle ergometer.

Figure 21:
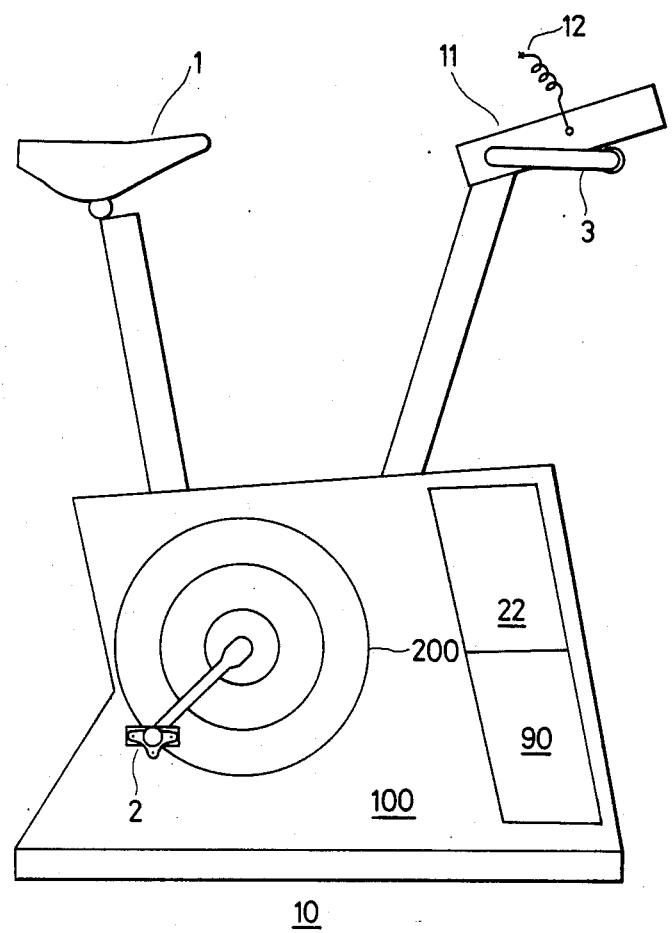
FIG. 21 shows a rotary loading device for practicing a method according to the present invention.

The bicycle ergometer shown in FIG. 21 is an apparatus for allowing a person to bend and stretch his legs under a load to measure his physical endurance. The bicycle ergometer 10 comprises a frame 100, loading means 200 such as an eddy current brake rotatably supported on the frame 100, and a pair of pedals 2 for rotating the loading means 200. The pedals 2 are so designed that the drive force is transmitted through a belt (not shown) and a reduction gear (not shown) to the rotor of the loading means 200.

The bicycle ergometer 10 further comprises a saddle 1 mounted on a supporting member extended from the frame 100. The saddle is vertically movable and a handle 3 is mounted on a supporting member extending from the frame 100 in front of the saddle 1. An input-/output box 11 is provided on the middle of the handle 3 for inputting physical conditions (described later) and outputting and indicating desired data. A pulse sensor 12 for detecting the pulses, i.e., the heart rate, of the user is installed on the side of the input/output box 11. A power source 22 for driving the loading means 200 and a control device 90 for controlling the input/output box 11 and the loading means are built into the frame 100. The loading means 200 has a rotation sensor for detecting the speed of the rotor (not shown).

Figure 22:
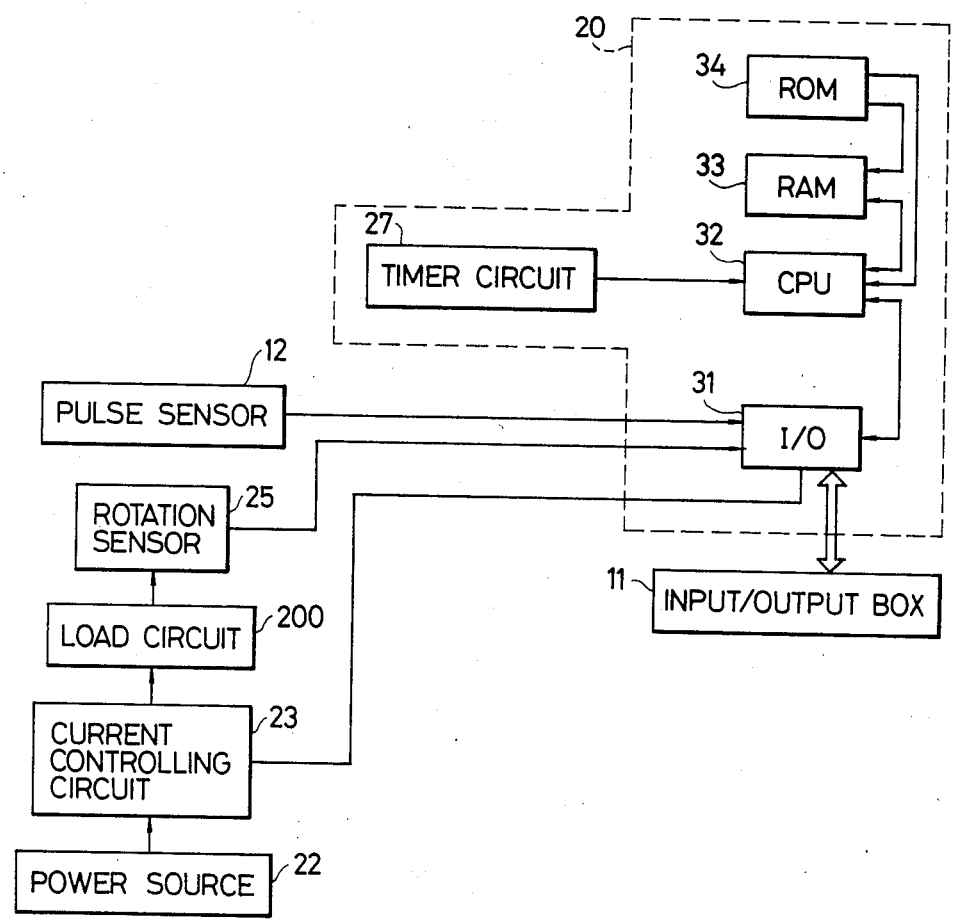
FIG. 22 is a block diagram showing arithmetic processing and peripheral units in the device shown in FIG. 21.

FIG. 22 shows an arithmetic control device and its peripheral equipment according to the present invention. The control device and peripheral equipment include an input/output unit 31, a central processing unit 32 (hereinafter referred to as a "CPU 32"), a random access memory (RAM) 33, and a read-only memory (ROM) 34. The elements 31 through 34 form a microcomputer 20. The microcomputer 20, according to a processing procedure stored in the ROM 34, receives the physical attributes of the user, e.g., age and sex, from the input/output box 11 and signals from the pulse sensor 12 and the rotation sensor 25 through the input/output unit 31, processes them, and stores the results in the RAM. The microcomputer 20 further operates to call the physical endurance measuring program stored in the ROM 34 and controls the amount of load of the loading circuit 200 through the input/output unit 31 and a current control circuit 23 according to the called program.

Figure 23:
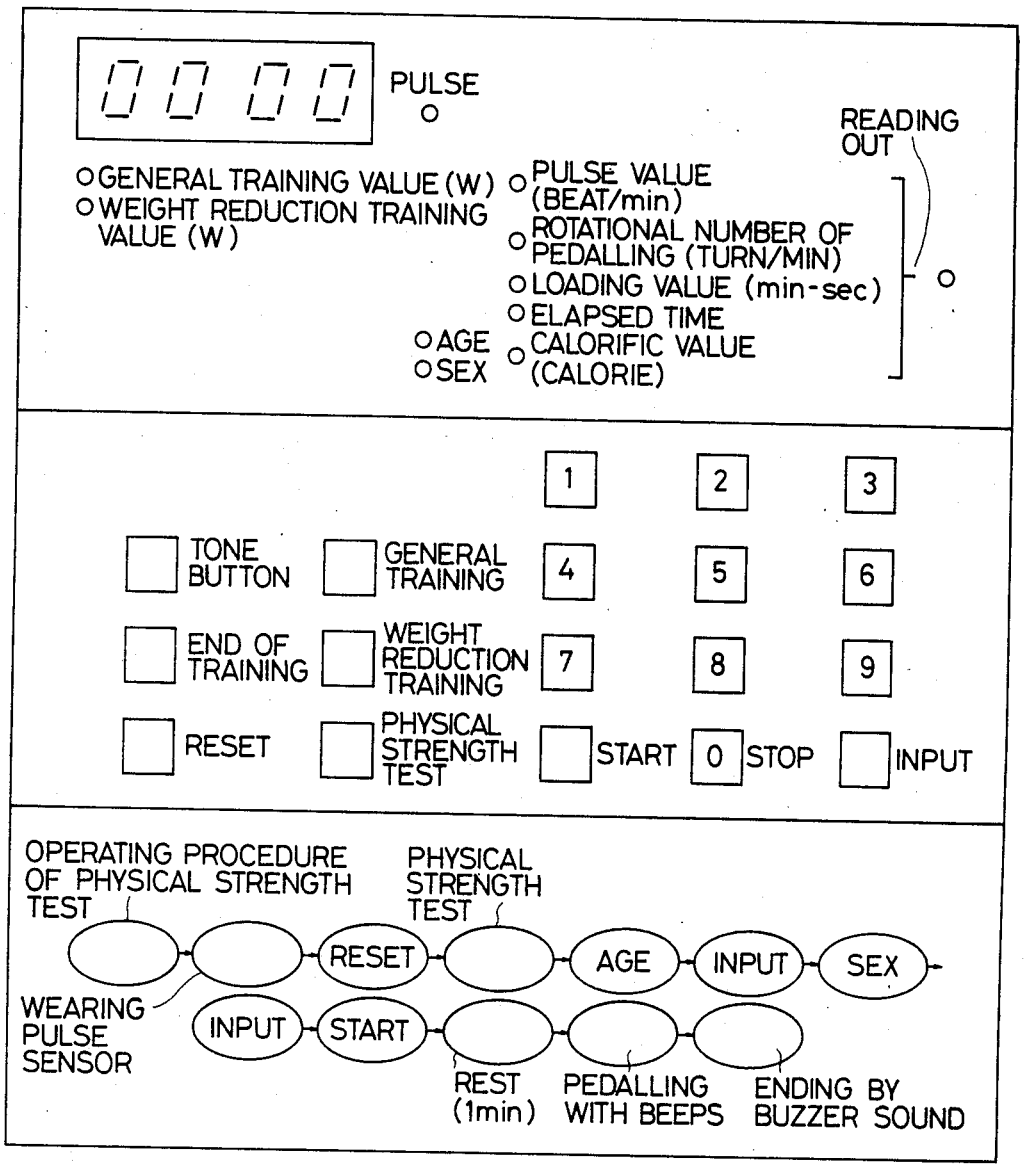
FIG. 23 shows the front panel of an input/output box in the device shown in FIG. 21.
Figure 24A:
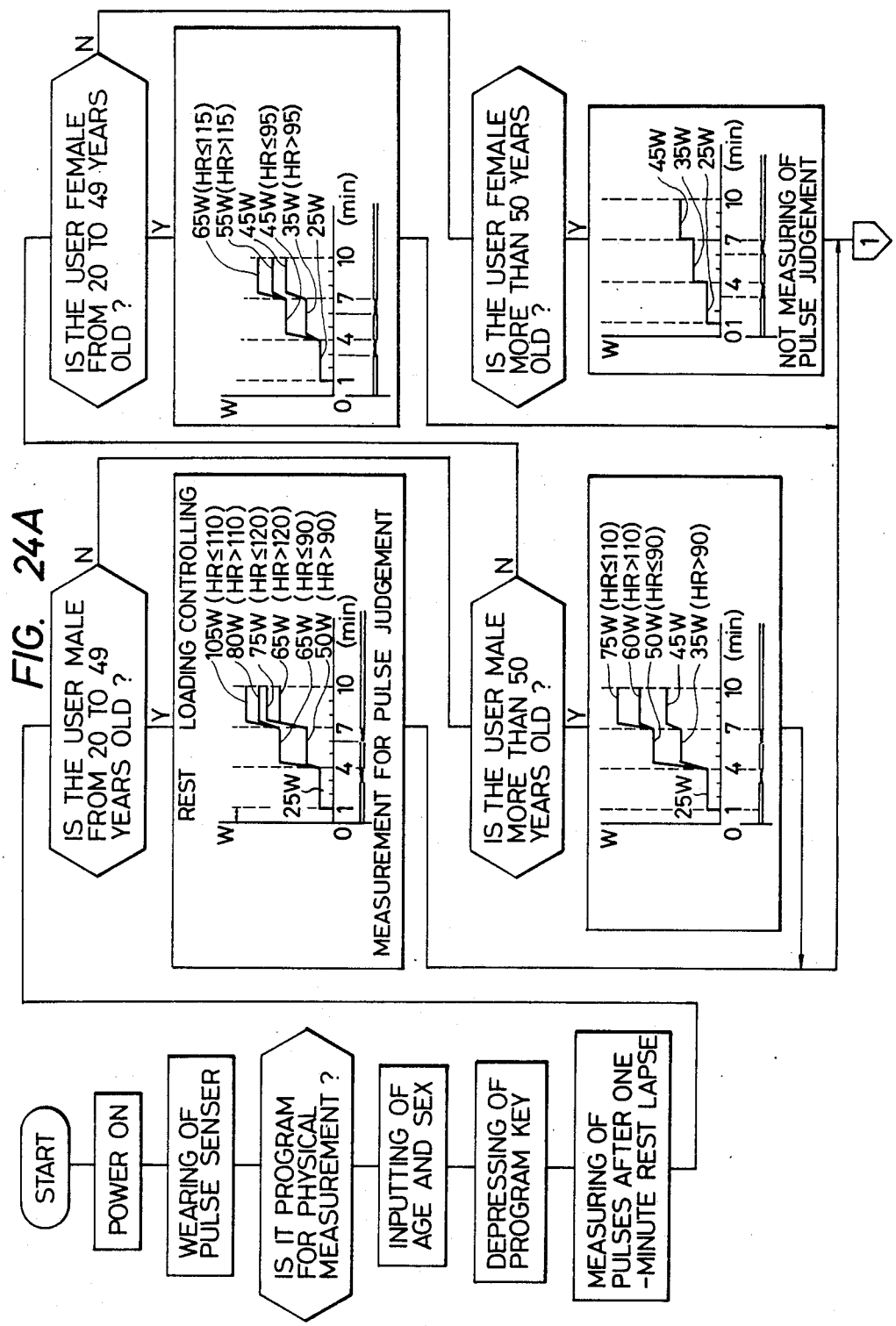

FIG. 23 shows the front panel of the input/output box 11, which consists of three parts. The keys for inputting the physical attributes of the user, e.g., age and sex, are arranged on the right side of the middle part of the front panel, and the keys for selecting a physical endurance measurement or training are arranged on the left side. A tone button is provided to enable the user to cause an audible beeping tone to be generated. The user synchronizes rotation of the pedals 2 to the beeps of the tone so that the ergometer is operated at a substantially constant rate. In order to start the physical endurance measurement, the user depresses the physical endurance test key and then inputs age and sex data according to the operating procedure which is indicated on the lower part of the front panel.

The user mounts the saddle 1 of the bicycle ergometer 10 shown in FIG. 21, and wears the pulse sensor 12 on an ear. Under this condition, the user depresses the reset key, operates the physical endurance test key, inputs age and sex data, and depresses the start key. When the physical endurance test key has been depressed and the age and sex data have been inputted one of the programs illustrated in FIGS. 19A, 19B, 20A, and 20B is transferred from the ROM to the RAM. The general expression for obtaining the maximum number of pulses and the athletic optimum number of pulses from age and sex is transferred from the ROM to the CPU. Next, calculations are performed in the CPU and the results of the calculations are stored in the RAM.

When the start key is depressed, the timer circuit 27 starts operation and the CPU counts the output pulses of the pulse sensor 12. This count value is stored in the RAM as the number-of-pulses at rest. In order to store the correct number of pulses, the number of pulses is sampled n times for m seconds, for instance three times for twenty seconds, and is converted into the number of pulses per minute. The number of pulses per minute may be averaged.

When a signal representing the lapse of one minute is applied to the CPU by the timer circuit 27, the CPU, according to the processing procedure transferred to the RAM, applies a digital signal corresponding to the first load value through the input/output unit 31 to the current control circuit 23. The current control circuit 23 has a D-A converter, to control the current supplied to the loading means 200 from the power source 22 in response to the signal from the input/output unit 31.

The loading means 200 is provided with a rotation sensor 25 which is coupled to the CPU through the input/output unit 31 in order to detect whether or not the user rotates the loading means in the preferable range of speed. When the timer circuit applies a signal representing the lapse of three minutes under the first load, the CPU counts the output signal of the pulse sensor 12 n times for m seconds within the range of four minutes, and converts the numbers of pulses counted into the numbers of pulses per minute. The numbers of pulses per minute are averaged and the averaged number of pulse per minute is stored as second data in the RAM 33.

In the CPU 32, the first reference value called out of the RAM 33 is compared with the second data to determine the second load value. A digital signal corresponding to the second load value is applied through the input/output unit 31 to the current control circuit 23.

As in the case of the first load value, the loading means 200 is controlled, and when a signal representing the lapse of six minutes is provided by the timer circuit 27, the output signal of the pulse sensor 12 is counted n times for m seconds within the range of seven minutes. The numbers of pulses counted are converted into the number of pulses per minute. The number of pulses per minute are averaged, so that the average number of pulses is stored as third data in the RAM 33.

In the CPU 32, the second reference value called out of the RAM 33 is compared with the third data to determine the third load value. Under the third load value, the CPU 32 counts the output signal of the pulse sensor 12 to calculate the numbers of pulses per minute and compares them with the athletic optimum number of pulses stored in the RAM 33 for the age and sex of the user. Only when the number of pulses counted after nine minutes have passed is equal to the athletic optimum number of pulses will the CPU 32 count the signals from the pulse sensor n times for m seconds within the range of ten minutes.

The numbers of pulses counted are converted into the number of pulses per minute. The number of pulses per minute obtained are averaged, and the average number of pulse per minute is stored, as fourth data, in the RAM 33. When the timer circuit 27 outputs a signal representing the lapse of ten minutes, the second, third and fourth data are transferred to the CPU 32 from the RAM 33, while a load -number-of-pulses approximation expression ($H = bx + a$) is called out of the ROM 34.

According to the resultant expression, a load value corresponding to the maximum number of pulses, which is obtained for the age and sex data stored in the RAM 33, is obtained. The products of these values and 0.7 (constant) are stored as the athletic optimum number of pulses and the load in the RAM 33. These values are also applied through the input/output unit 11 to the display unit of the input/output box 11 so as to be displayed as general training values (W).

When the number of pulses of the user reaches the athletic optimum number of pulses stored in the RAM, before the timer circuit applies the signal representing the lapse of nine minute to the CPU, the following operations are carried out. The CPU 32 drives a signal generating circuit (not shown) in the input/output box 11 to operate a buzzer or the like to inform the user of the above-described condition, and to indicate that the physical endurance measuring program should be suspended. Furthermore, the first, second, and third data stored in the RAM 33 are transferred to the CPU 32, while the load versus number-of-pulses approximation expression is called out of the ROM 34. As in the above-described case, the load versus number-of-pulse graph is approximated to calculate the athletic optimum load and the number of pulses and to indicate them on the display unit of the input/output box.

In the above-described measurement of the numbers of pulses for the first through fourth data, when it is estimated that the number of pulses reaches the steady number of pulses, the number of pulses are counted n times for m seconds, for instance three times for twenty seconds. The number of pulses counted are converted into the number of pulses per minute, and the numbers of pulses per minute obtained are averaged to obtain the average number of pulses.

This method may lead to noticeable error, however, because the number of pulses counted must be multiplied by a factor of three (or 60/m) to obtain the number of pulses per minute. Accordingly, in order to measure the steady number of pulses under a predetermined load more accurately, the numbers of pulses should be averaged by the moving average method. That is, after it is estimated that the steady number of pulses has been reached under the predetermined load, the periods of pulses detected by the pulse sensor are successively measured, and the arithmetic mean of n (integer) preceding data is calculated as a pulse period at the present. Then, the arithmetic mean of the moving average pulse periods obtained successively is calculated to provide the number of pulses per minute.

More preferably, the following method should be employed. Of the moving average pulse periods, the maximum and the minimum are eliminated, and the arithmetic mean of the remaining moving average pulse periods is calculated to obtain the number of pulses per minute.

As was described above, in the measurement of physical endurance according to the method of the invention, the load versus number-of-pulses of each individual has been stored in the RAM 33. The load value (evaluation values) for instance with the number of pulses 150 or 130, namely, PWC 150 or 130 can be readily calculated.

As described above the categories for the physical endurance program are male and female, and ages of 20–49 years old and more than 50 years old. However, it is possible to separate ages into small groups so as to measure athletic optimum condition more accurately. A general equation for the load versus pulse graph for each generation is obtainable and it is possible to calculate the maximum number of pulses, the athletic optimum number of pulses, the athletic safety number of pulses, and the maximum athletic number of pulses. Therefore, it is possible to make a physical endurance program for many sex and age combinations.

Figure 25A:
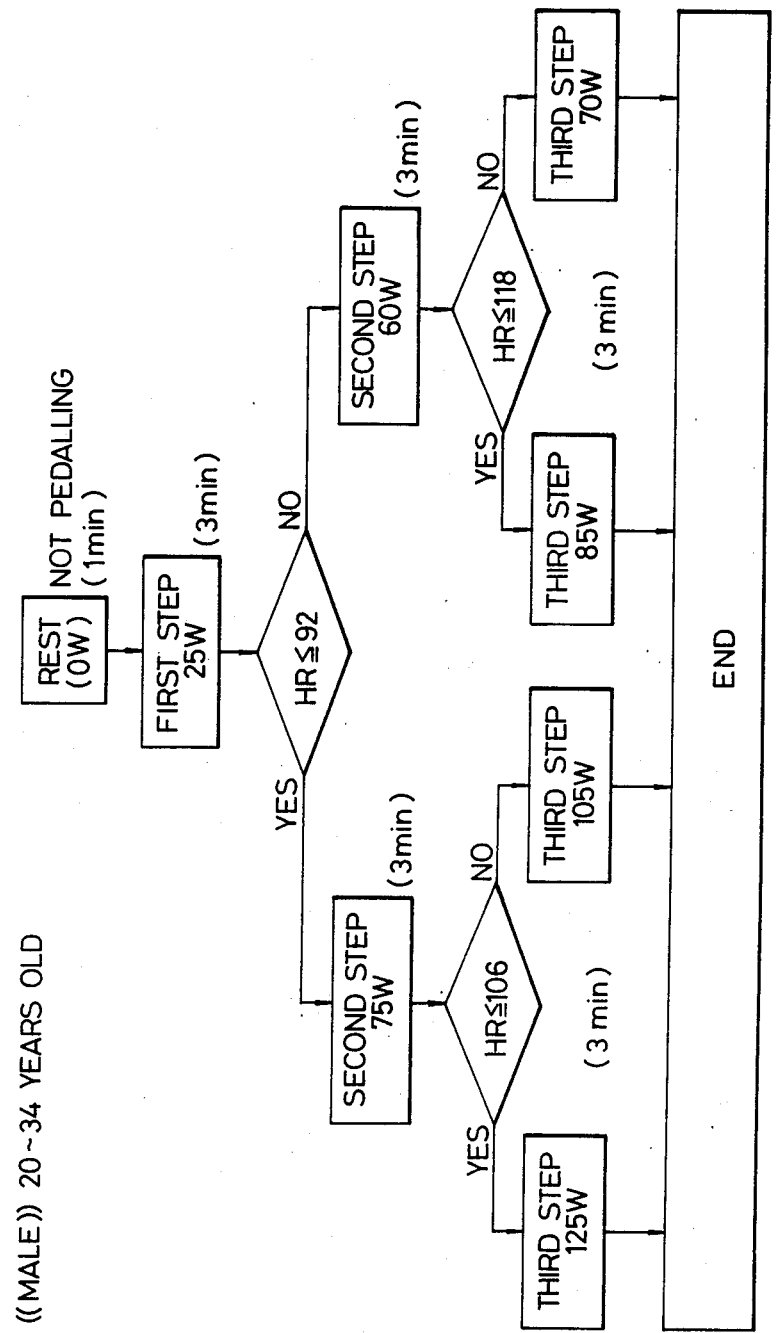
FIGS. 25 (A)-(C) and 26 (A)-(C) are explanatory diagrams showing physical strength test programs.
Figure 25B:
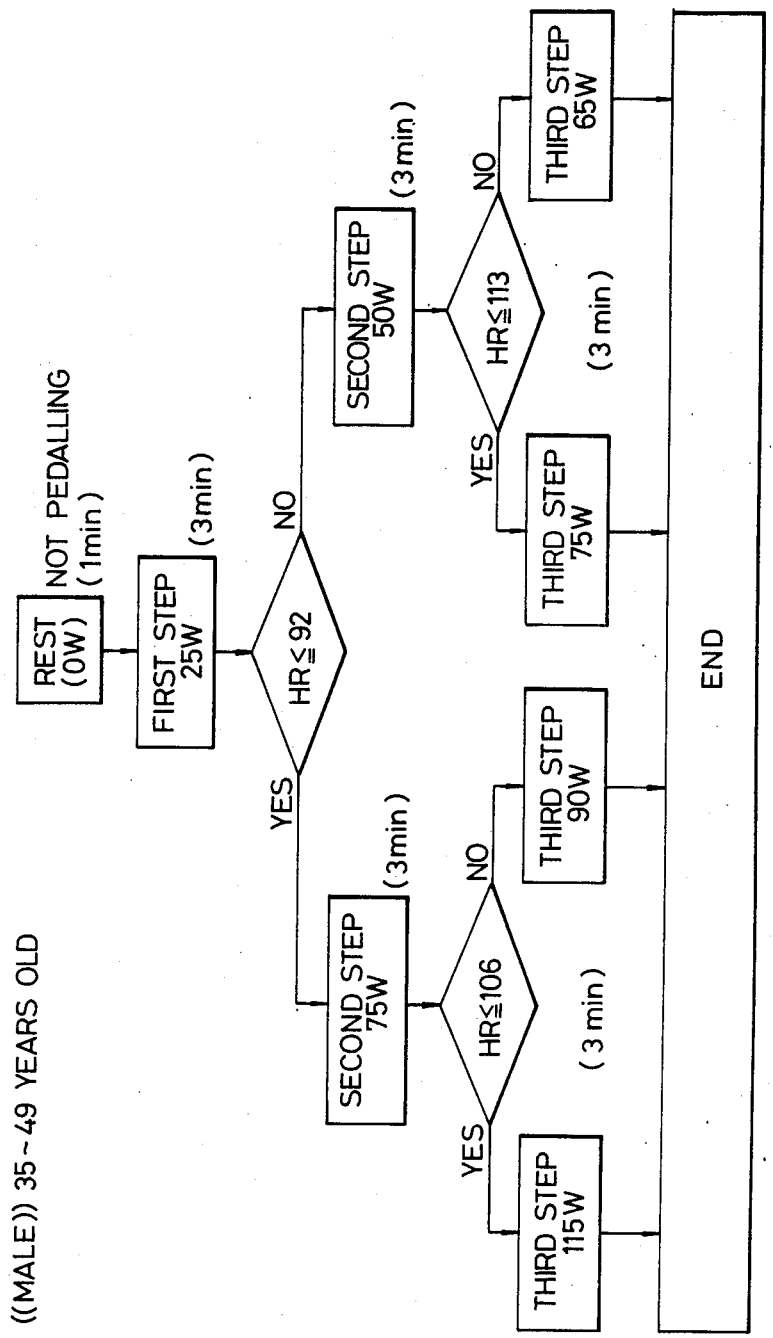
Figure 25C:
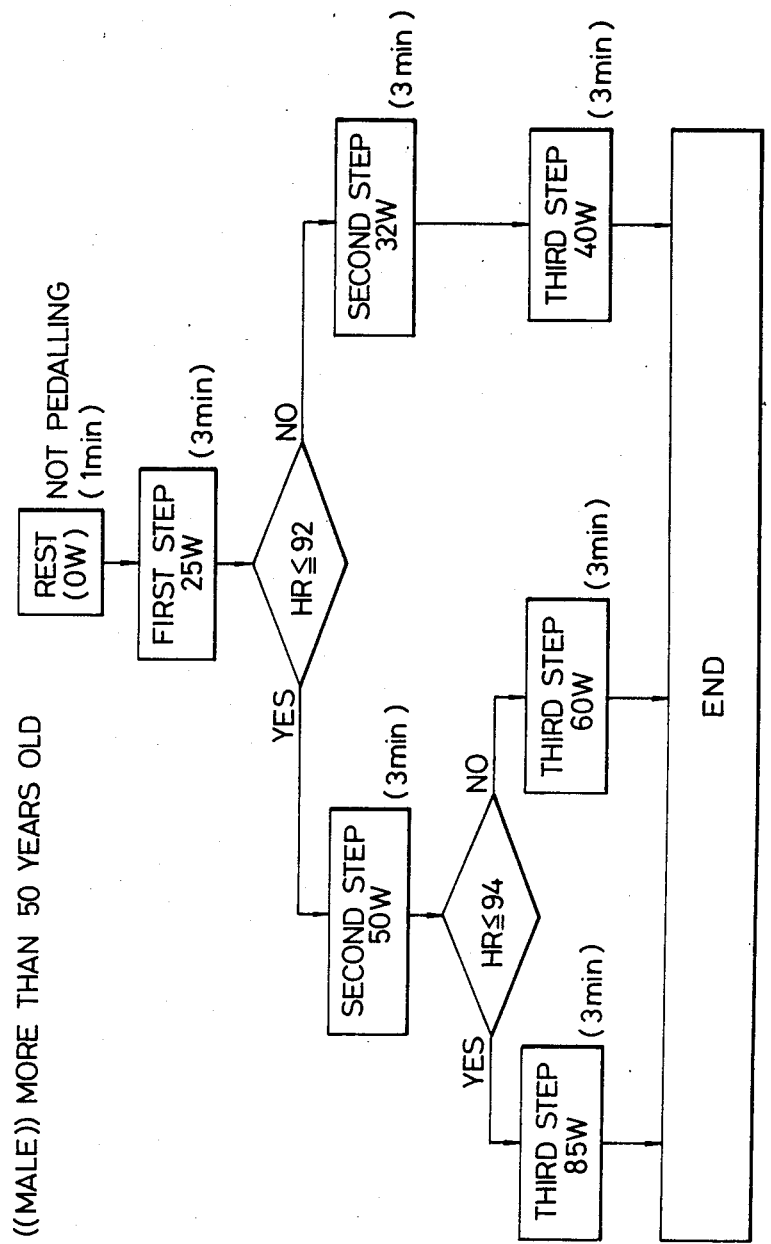
Figure 26A:
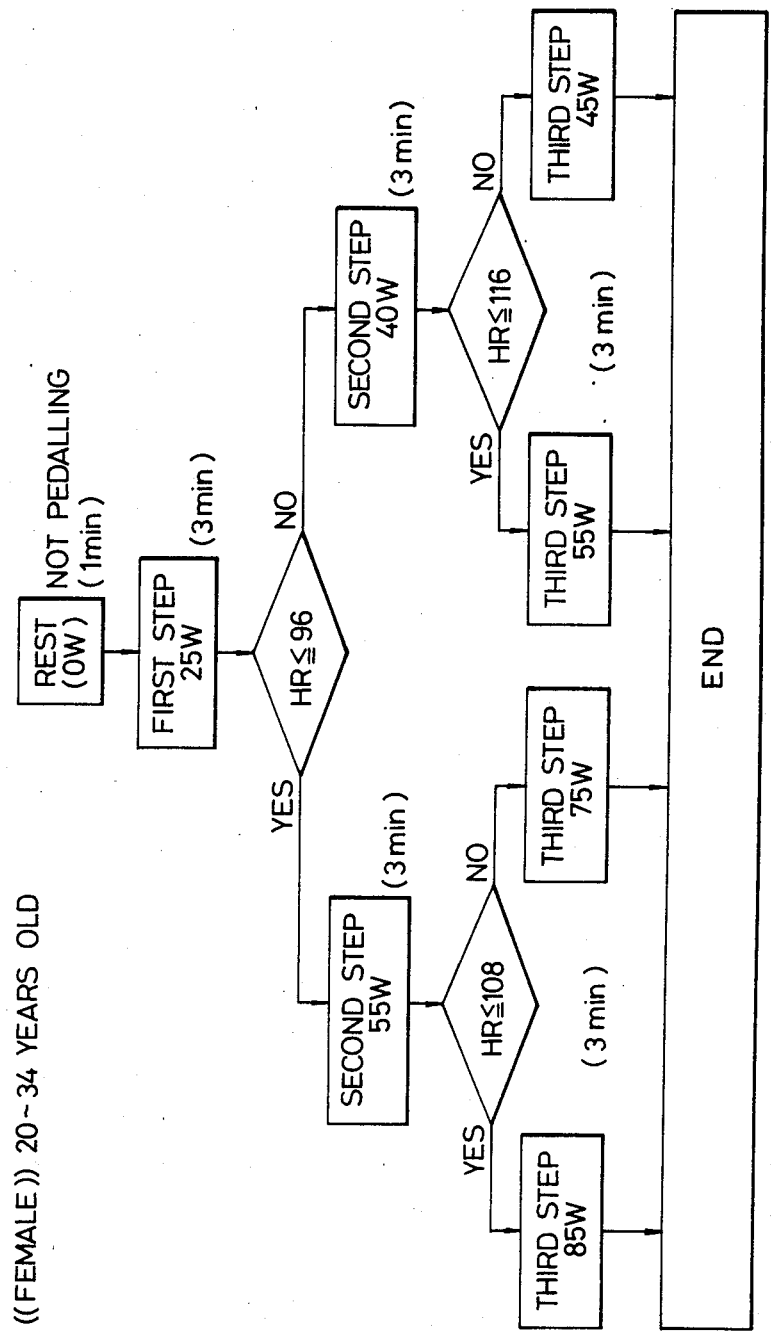
Figure 26B:
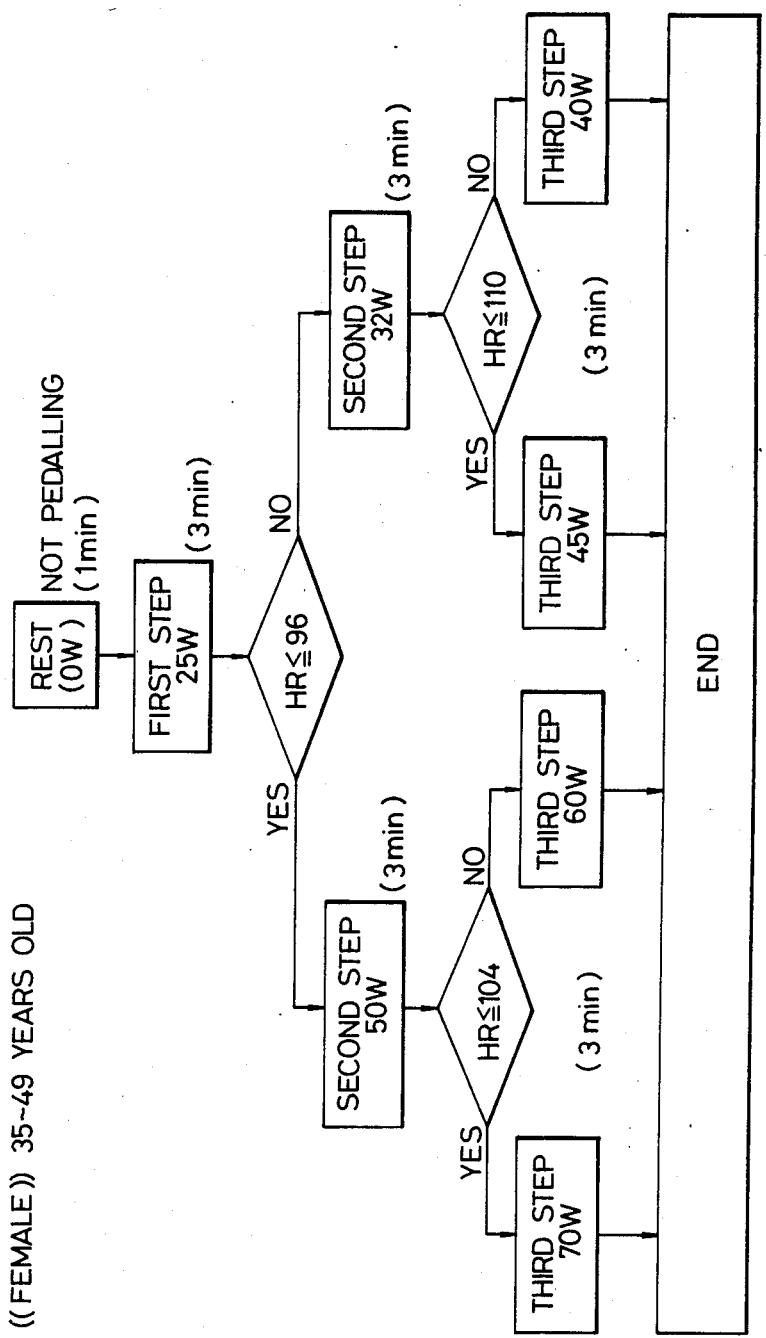
Figure 26C:
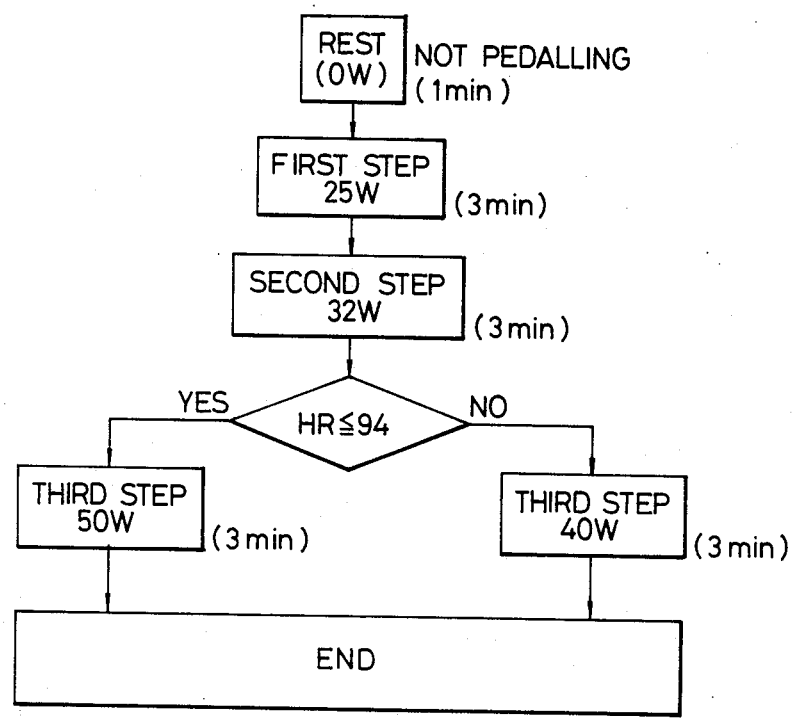
Figure 27A:
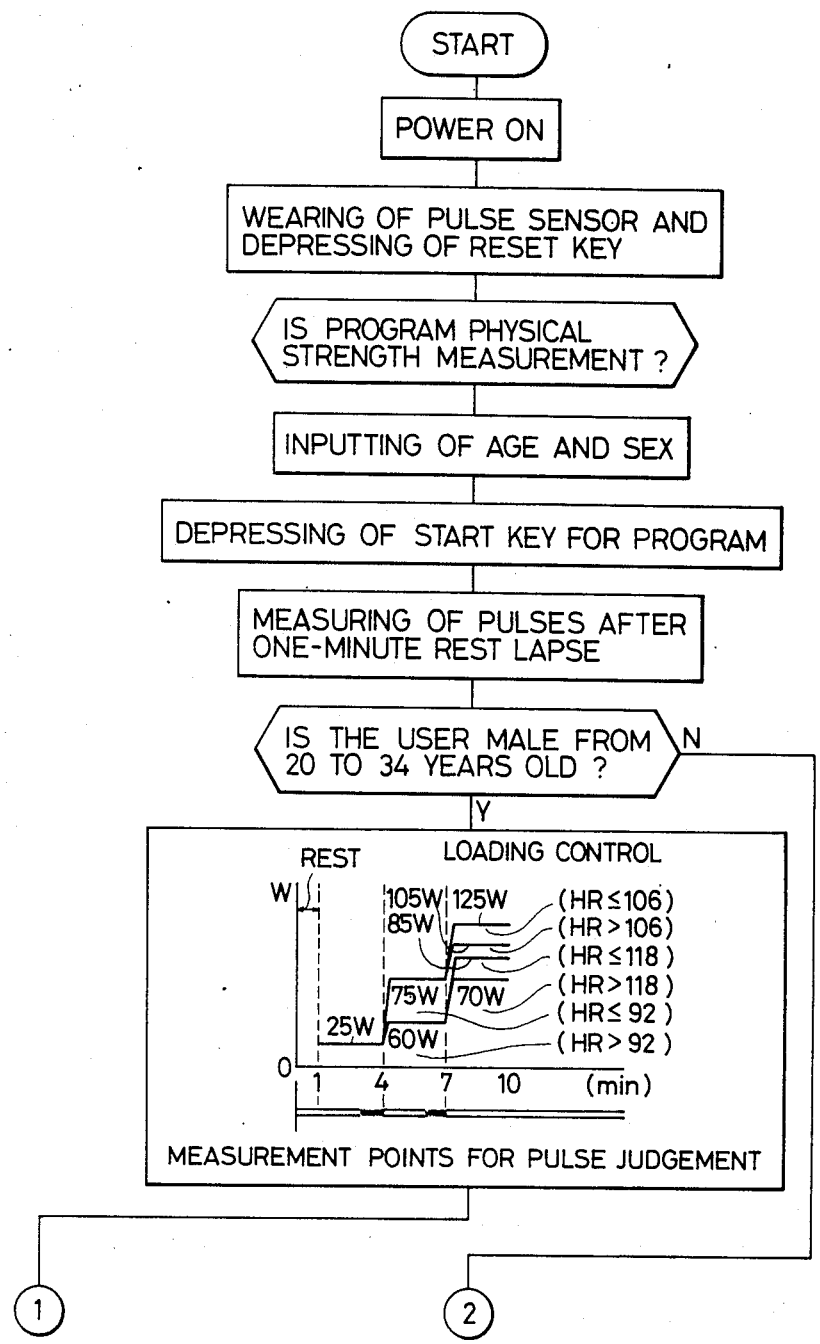
FIGS. 27 (A)-(C) illustrate a flow chart for the physical strength measurement program of FIGS. 25 (A)-(C) and 26 (A)-(C).
Figure 27B:
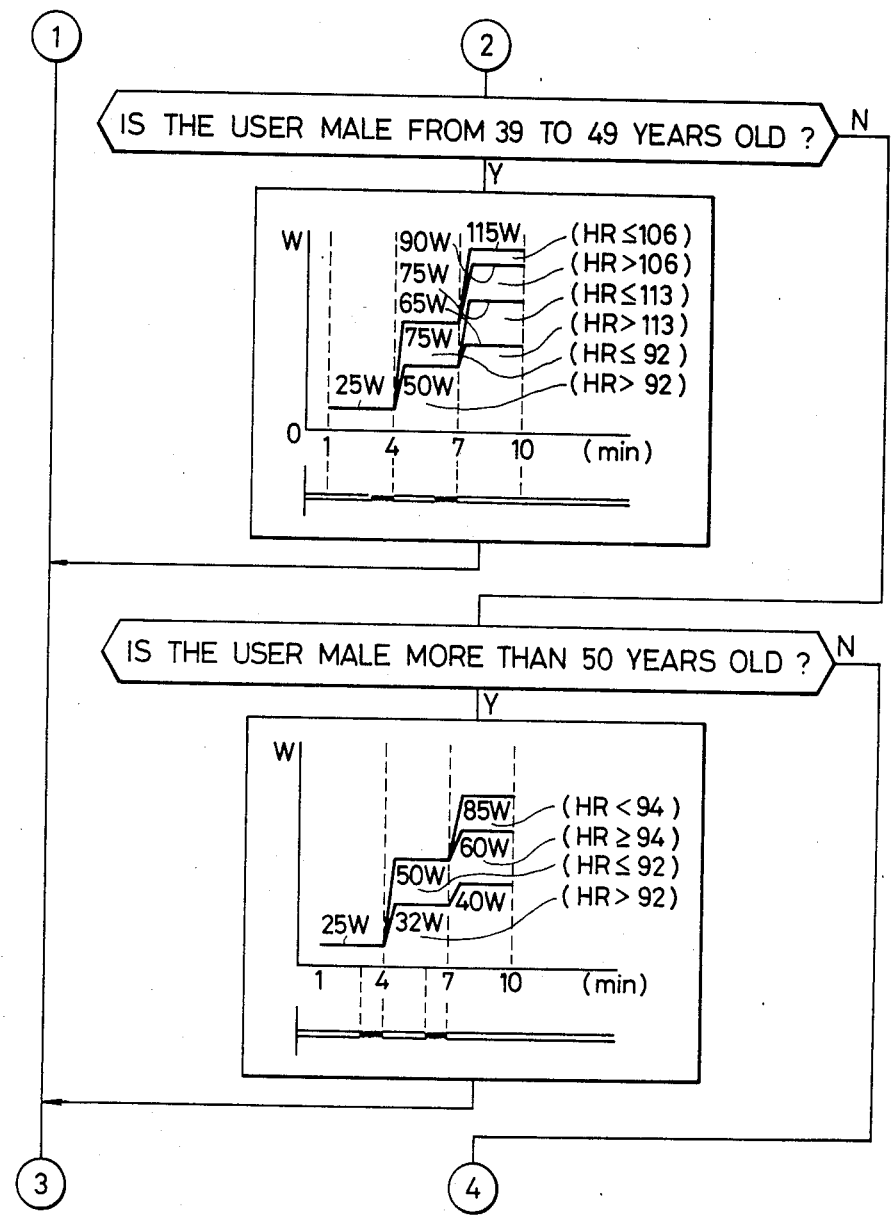
Figure 27C:
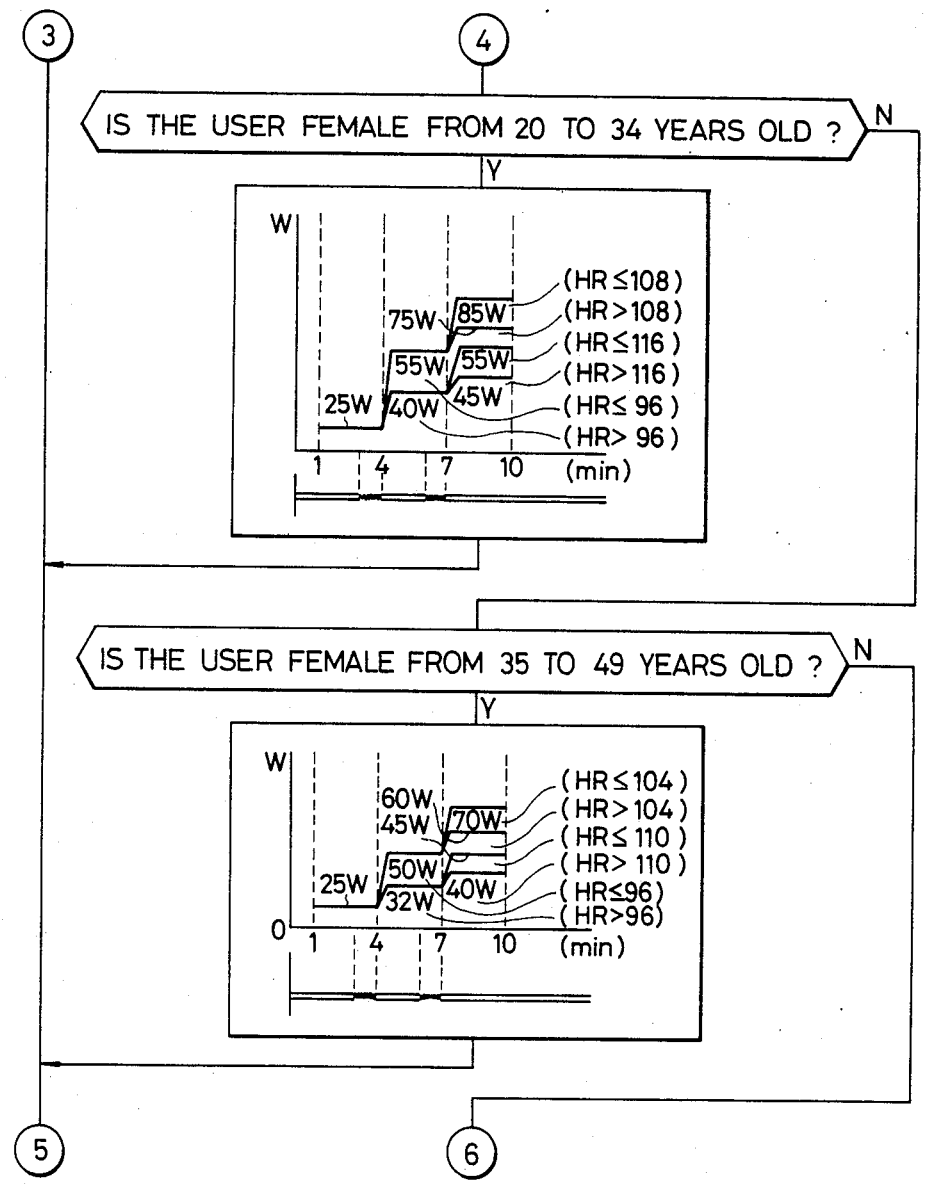
Figure 27D:
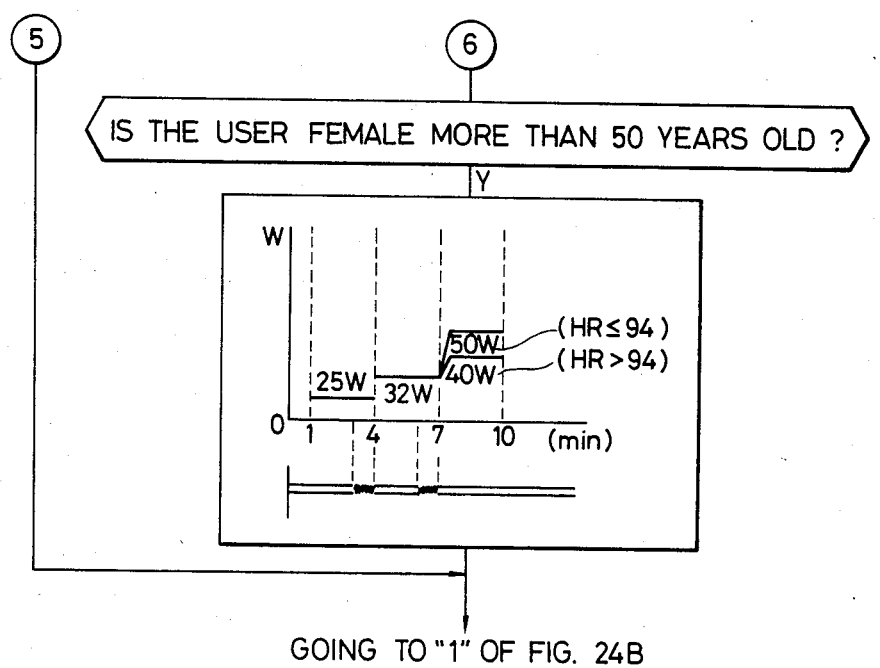

For example, FIGS. 25 (A)–(C) and 26 (A)–(C) show physical endurance programs for the users of 20–34 years old and of 35–49 years old separated from that of 20–49 years old as shown in FIGS. 19A, 19B, 20A, and 20B. FIGS.27 (A)–(C) show a flow chart for each program.

According to the disclosed invention, the measured optimum load value and the steady number of pulses at that time, Physical Working Capacity (PWC) 150 or 130, and the load versus number-of-pulses graph are displayed by the display unit. They are extinguished, however, when the power switch is turned off. Therefore, it may be preferable to use a printer for printing out these data.

If these data are stored in a memory means provided internally or externally so that they can be read when necessary, then when the user carries out the physical endurance test anew, the values can be utilized as comparison data. In addition, it is unnecessary to input the data for daily training. Thus, this method is advantageous.

In order to cause means inside the device to store the data, a memory backed up by dry cells or the like can be separately provided so that the data together with an ID code given to the user are stored therein. Alternatively, a non-volatile memory can be used. Control would be made so that by merely inputting the ID code, all the data will be called out of the memory and transferred to the RAM 33. In order to allow means outside the device to store the data, a magnetic card may be employed to store the data. This method is more convenient because it is unnecessary to input the ID code since the data would be stored on the magnetic card.

While the salient features of the invention have been described with reference to the drawings, it should be understood that the embodiments and methods described herein are susceptible of modification and alteration without departing from the spirit and scope of the following claims.

What is claimed is:

1. An ergometer for obtaining an optimum athletic load value for a user of an exercise device in which the legs of the user are bent and stretched to rotate a rotary unit having a variable load applied thereto during continuous exercise by the user, the athletic load value being increased step-wise in accordance with a linear load versus pulse rate correlation graph, the ergometer comprising:

means for sequentially setting the load to first, second, and third levels;

means for determining a first data corresponding to the pulse rate of the user at rest, a second data corresponding to the pulse rate of the user after exercise with the rotary unit having said first load level applied thereto, a third data corresponding to the pulse rate of the user after exercise with the rotary unit having said second load level applied thereto, and a fourth data corresponding to the pulse rate of the user after exercise with a rotary unit having said third load level applied thereto;

means for providing a reference graph comprising the pulse rate versus load level correlation graph as computed by a minimum square law average;

means responsive to said first, second, and third data for determining from said referenace graph said first, second, and third levels according to said first, second, and third data, respectively, and for controlling said setting means to sequentially set said load to said first, second and third levels; and optimum load determining means for determining an optimum load level for the user from said second to fourth data if said fourth data is less than an athletic safety pulse rate or from said first to third data if the pulse rate of the user reaches the athletic safety pulse rate before said determining means determines said fourth data.

2. A method of obtaining an optimum athletic load value for a user of an exercise device in which the legs of the user are bent stretched to rotate a rotary unit having a variable load applied thereto during continuous exercise by the user, the athletic load value being increased stepwise, and in each step the load value and a steady number of pulses per minute of the user being measured to provide a linear load versus number- of-pulses correlation graph, the method comprising the steps of:

measuring the number of pulses per minute of the user when the user is at rest to produce a first data element;

measuring the steady number of pulses per minute of the user under a first load to produce a second data element;

comparing said second data element with a first reference value which is the steady number of pulses per minute under the first load on a statistically obtained load versus number-of-pulses correlation graph computed by a minimum square law average corresponding to the age and sex of the user and thereby determining a second load value;

measuring the steady number of pulses per minute of the user under the second load value to produce a third data element;

comparing said third data element with a second reference value which is the steady number of pulses per minute under the second load on a statistically obtained load versus number-of-pulses graph computed by a minimum square law average corresponding to the age and sex of the user and thereby determining a third load value;

measuring the steady number of pulses per minute of the user under the third load value to produce a fourth data element, the upper limit of the measured steady state number of pulses being limited by an athletic safety number of pulses per minute for the user; and determining the optimum athletic load value by obtaining a load versus number-of-pulses approximation line the upper limit of which is determined by a maximum number of pulses per minute calculated in response to the age and sex of the user, according to the second through fourth data elements or the first through third data elements if the athletic safety number of pulses per minute was reached before the fourth data element was obtained.

3. A method according to claim 2, further including the steps of storing said first, second, third, and optimum athletic load values in a memory means whereby said stored load values can be read from the memory means in accordance with the instructions of a program.

* * * * *